(12) United States Patent
Yuan et al.

(10) Patent No.: US 12,346,677 B2
(45) Date of Patent: Jul. 1, 2025

(54) DRIVER CONFIGURATION MANAGEMENT METHOD AND APPARATUS, MEDIUM, DEVICE, AND SYSTEM

(71) Applicant: Huawei Technologies Co., Ltd., Shenzhen (CN)

(72) Inventors: Bo Yuan, Xi'an (CN); Feng Chen, Shenzhen (CN); Yanying Tan, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 175 days.

(21) Appl. No.: 18/175,113

(22) Filed: Feb. 27, 2023

(65) Prior Publication Data

US 2023/0214231 A1    Jul. 6, 2023

Related U.S. Application Data

(63) Continuation of application No. PCT/CN2021/110860, filed on Aug. 5, 2021.

(30) Foreign Application Priority Data

Aug. 29, 2020  (CN) .......................... 202010890830.1
Jan. 27, 2021   (CN) .......................... 202110112587.5

(51) Int. Cl.
    *G06F 8/41*    (2018.01)
(52) U.S. Cl.
    CPC .............. *G06F 8/443* (2013.01); *G06F 8/447* (2013.01)
(58) Field of Classification Search
    CPC .............................................. G06F 8/443–447

USPC .................................................. 717/125–151
See application file for complete search history.

(56) References Cited

U.S. PATENT DOCUMENTS

| | | | | | |
|---|---|---|---|---|---|
| 5,991,830 | A | * | 11/1999 | Beard | G06F 12/0676 |
| | | | | | 711/E12.089 |
| 6,029,168 | A | * | 2/2000 | Frey | G06F 16/10 |
| 7,316,008 | B1 | * | 1/2008 | Dutta | G06F 8/74 |
| | | | | | 717/136 |

(Continued)

FOREIGN PATENT DOCUMENTS

| CN | 102193788 A | 9/2011 |
|---|---|---|
| CN | 106445504 A | 2/2017 |

(Continued)

OTHER PUBLICATIONS

Conradi et al., "Version Models for Software Configuration Management", ACM, pp. 1-51 (Year: 1998).*

(Continued)

*Primary Examiner* — Anil Khatri
(74) *Attorney, Agent, or Firm* — Conley Rose, P.C.

(57) ABSTRACT

A driver configuration management method may be applied to a management device and includes determining target information, where the target information is used to represent a computing capability of an electronic device; converting, based on the target information, a configuration source file into a target configuration file that uses a target file format; and sending the target configuration file to the electronic device. The method may be applied to a scenario in which the management device generates and sends configuration files in different formats for electronic devices having different computing capabilities.

20 Claims, 23 Drawing Sheets

(56) References Cited

U.S. PATENT DOCUMENTS

| | | | | |
|---|---|---|---|---|
| 7,356,679 | B1 * | 4/2008 | Le | G06F 16/116 713/1 |
| 7,454,744 | B2 * | 11/2008 | Bhogal | G06F 8/73 717/122 |
| 8,417,490 | B1 * | 4/2013 | Preston | G06F 30/15 703/22 |
| 8,830,504 | B2 * | 9/2014 | Ohara | G06F 3/1288 358/1.15 |
| 9,058,423 | B1 * | 6/2015 | Stone | G06F 11/3698 |
| 9,251,020 | B1 * | 2/2016 | Kalekar | G06F 11/2071 |
| 9,891,860 | B1 * | 2/2018 | Delgado | G06F 3/0641 |
| 10,049,122 | B1 * | 8/2018 | Faibish | G06F 16/188 |
| 10,437,521 | B2 * | 10/2019 | Joseph | G06F 3/0619 |
| 11,144,288 | B1 * | 10/2021 | Nawathe | G06F 8/41 |

FOREIGN PATENT DOCUMENTS

| | | |
|---|---|---|
| CN | 110096278 A | 8/2019 |
| CN | 110389755 A | 10/2019 |
| CN | 111741015 A | 10/2020 |

OTHER PUBLICATIONS

Chen et al., "Adapting Multi-objectivized Soware Configuration Tuning", ACM, pp. 1-23 (Year: 2024).*

Xia et al, "CoMSA: A Modeling-Driven Sampling Approach for Configuration Performance Testing", IEEE, pp. 1-12 (Year: 2023).*

Pohl et al, "Variant Management Solution for Large Scale Software Product Lines", ACM, pp. 1-10 (Year: 2018).*

Dart, "Concepts in Configuration Management Systems", ACM, pp. 1-18 (Year: 1991).*

Anonymous:"HDF Configuration Overview," Sep. 9, 2020, pp. 1-4, XP093111716.

Liu Xiyao, "docs_driver_Configuration Management.md HiHopeORG_harmonyos-1.0-Code Cloud-Open Source China," Aug. 9, 2019, XP093111697, with the Englsih Abstract, 14 pages.

Wikipedia, "HarmonyOS version history," Dec. 12, 2023, XP093111718, 7 pages.

* cited by examiner

```
 Offset:   00 01 02 03 04 05 06 07 08 09 0A 0B 0C 0D 0E 0F
00000000:  0A A0 0A A0 00 00 00 00 00 00 0A 00 00 0C 00 00   .....@.........
00000010:  8C 00 00 00 01 72 6F 6F 74 00 00 40 00 00 02 60   ......root...@...`
00000020:  6F 64 75 6C 65 00 73 61 6D 70 6C 65 00 64 01 64   odule..sample..d
00000030:  65 76 69 63 65 30 00 00 00 20 00 6C 6F 02 76 69   evice0... .devi
00000040:  63 65 4E 61 6D 65 00 14 66 6F 6F 00 02 72 65 67   ceName..foo..reg
00000050:  42 61 73 65 00 00 12 00 FF 00 00 65 00 4F 31 00   Base.....regOf
00000060:  66 73 65 74 00 10 01 01 64 76 69 63 65 4F 66 00   fset....device1.
00000070:  2C 00 00 00 02 00 02 64 65 72 69 63 6E 61 65 00   ....deviceName.
00000080:  14 42 61 72 00 02 72 65 67 42 4F 66 00 00 00 00   .bar..regOffset.
00000090:  10 02 02 72 65 67 42 61 73 65 00 12 00 FF 00 00   ...regBase.....
```

FIG. 3

Compilation software a

File (F)  Edit (E)  View (v)  Insert (I)  Program (P)  Build (B)  Tool (T)  Window (W)  Help (H)    Binary ──411
                                                                                          configuration ▼

Compile  Save  Compile and output  Input path  Output path ...

Configuration source code

```
1   root {
2       module = "sample";
3       device0 { // Device 0
4           deviceName = "foo"; // Name of the device 0
5           regBase = 0xff00; // Register base address
6           regOffset = 0x1; // Register offset
7       }
8       device1 : device0 {// A configuration of a device 1 is first copied from
                            a configuration of the device 0
9           deviceName = "bar"; // Name of the device 1
10          regOffset = 0x2; // Register offset
11      }
12  }
13
```

...

Error message: None

FIG. 4A

Compilation software a

File (F)  Edit (E)  View (v)  Insert (I)  Program (P)  Build (B)  Tool (T)  Window (W)  Help (H)   C language — 411
                                                                                                   configuration ▼
— 41
Compile  Save  Compile and output  Input path  Output path  ...   — 42

Configuration source code

```
1   root {
2       module = "sample";
3       device0 { // Device 0
4           deviceName = "foo"; // Name of the device 0
5           regBase = 0xff00; // Register base address
6           regOffset = 0x1; // Register offset
7       }
8       device1 : device0 { // A configuration of a device 1 is first copied from
                            // a configuration of the device 0
9           deviceName = "bar"; // Name of the device 1
10          regOffset = 0x2; // Register offset
11      }
12  }
13
```

— 43

— 45

Error message: None   — 44

FIG. 4C

Compilation software a

File (F)  Edit (E)  View (v)  Insert (I)  Program (P)  Build (B)  Tool (T)  Window (W)  Help (H)   Binary ⎯⎯ 411
                                                                                                    configuration ▶

Compile  Save  Compile and output  Input path  Output path  ...

Configuration source code

```
1   root {
2      module = "sample";
3      device0 {// Device 0
4         deviceName = "foo"; // Name of the device 0
5         regBase = 0xff00; // Register base address
6         regOffset = 0x1; // Register offset
7      }
8      device1 : device0 {// A configuration of a device 1 is first copied from
                          a configuration of the device 0
9         deviceName = "bar"; // Name of the device 1
10        regOffset = 0x2; // Register offset
11     }
12  }
13
```

Error message:
location: line 2, error content:;; repeat

FIG. 4D

Compilation software a

| File (F) | Edit (E) | View (v) | Insert (I) | Program (P) | Build (B) | Tool (T) | Window (W) | Help (H) | Binary configuration ▼ — 411 |

Compile  Save  Compile and output  Input path  Output path  ...

| Configuration source code | | |
|---|---|---|
| Abstract syntax tree 1 | | |
| 1 | CONFNODE | ForestRoot // Root node |
| 2 | CONFNODE | root |
| 3 | CONFTERM | module |
| 4 | STRING | ∟ sample |
| 5 | CONFNODE | device0 |
| 6 | CONFTERM | deviceName |
| 7 | STRING | ∟ foo |
| 8 | CONFTERM | regBase |
| 9 | UINT32 | ∟ ff00 |
| 10 | CONFTERM | regOffset |
| 11 | UINT8 | ∟ 1 |
| 12 | CONFNODE | device1  NodeCopy  device0 |
| 13 | CONFTERM | deviceName |
| 14 | STRING | ∟ bar |
| 15 | CONFTERM | regOffset |
| 16 | UINT8 | ∟ 2 |
| 17 | | |

Error message: None

FIG. 4E

Compilation software a

File (F)  Edit (E)  View (v)  Insert (I)  Program (P)  Build (B)  Tool (T)  Window (W)  Help (H)   Binary —— 411
configuration ▶

Compile  Save  Compile and output  Input path  Output path  ...

| Configuration source code | | |
|---|---|---|
| Abstract syntax tree 1 | | |
| Abstract syntax tree 2 | | |
| 1 | CONFNODE | root |
| 2 | CONFTERM | module |
| 3 | STRING | ∟ sample |
| 4 | CONFNODE | device0 |
| 5 | CONFTERM | deviceName |
| 6 | STRING | ∟ foo |
| 7 | CONFTERM | regBase |
| 8 | UINT32 | ∟ ff00 |
| 9 | CONFTERM | regOffset |
| 10 | UINT8 | ∟ 1 |
| 11 | CONFNODE | device1 |
| 12 | CONFTERM | deviceName |
| 13 | STRING | ∟ bar |
| 14 | CONFTERM | regOffset |
| 15 | UINT8 | ∟ 2 |
| 16 | CONFTERM | regBase |
| 17 | UINT32 | ∟ ff00 |

Error message: None

FIG. 4F

Compilation software a

File (F)  Edit (E)  View (v)  Insert (I)  Program (P)  Build (B)  Tool (T)  Window (W)  Help (H)   Binary configuration ▼ —411

Compile  Save  Compile and output  Input path  Output path  ...

Configuration source code

Abstract syntax tree 1

Abstract syntax tree 2

Binary configuration file code

```
 1  | Offset: 00 01 02 03 04 05 06 07 08 09 0A 0B 0C 0D 0E 0F
 2  00000000: 0A A0 0A BC 00 00 00 00 40 00 00 00 00 00 00 00   ........@.......
 3  00000010: BC 00 00 00 01 72 6F 6F 74 00 82 00 00 00 02 60   .....root......`
 4  00000020: 6F 64 73 00 14 73 61 60 70 6C 65 00 00 01 64 65   ...ds..sample..de
 5  00000030: 65 76 69 63 65 73 30 00 2C 00 00 02 64 65 76 69   evices0.,...devi
 6  00000040: 63 65 4E 61 6D 65 00 14 66 6F 6F 00 02 72 65 67   ceName..foo..reg
 7  00000050: 42 61 73 65 00 12 00 FF 00 00 82 72 65 67 4F 66   Base......regOf
 8  00000060: 66 73 65 74 00 10 01 64 65 76 69 63 65 4E 31 00   fset...device1.
 9  00000070: 2C 00 00 00 02 64 65 76 69 63 65 4E 61 6D 65 00   ,....deviceName.
10  00000080: 14 62 61 72 00 02 72 65 67 4F 66 66 73 65 74 00   .bar..regOffset.
11  00000090: 10 02 02 72 65 67 42 61 73 65 00 12 00 FF 00 00   ...regBase......
12                                                ⋮
13
14
15
16
17
```

Error message: None

FIG. 4G

Compilation software a

| File (F) Edit (E) View (v) Insert (I) Program (P) Build (B) Tool (T) Window (W) Help (H) | C language configuration ▼ — 411 |

Compile  Save  Compile and output  Input path  Output path  ...

Configuration source code

Abstract syntax tree 1
Abstract syntax tree 2
C language configuration file code
Header file
Content file

```
1  /*
2   * It's HDF config auto-gen file, do not modify it manually
3   */
4
5  #ifndef HCS_CONFIG_SAMPLE_HEADER_H
6  #define HCS_CONFIG_SAMPLE_HEADER_H
7
8  #include <stdint.h>
9
10 struct HdfConfigSampleDevice0 {
11     const char* deviceName;
12     uint16_t regBase;
13     uint8_t regOffset;
14 };
15
16 struct HdfConfigSampleDevice1 {
17     const char* deviceName;
```

Error message: None

FIG. 4H

Compilation software a

File (F)  Edit (E)  View (v)  Insert (I)  Program (P)  Build (B)  Tool (T)  Window (W)  Help (H)    C language configuration ▼ — 411

Compile  Save  Compile and output  Input path  Output path  ...

Configuration source code

Abstract syntax tree 1

Abstract syntax tree 2

C language configuration file code

Header file

Content file

```
1  /*
2   * It's HDF config auto-gen file, do not modify it manually
3   */
4
5  #include "sample.h"
6
7  static const struct HdfConfigSampleRoot g_hdfConfigSampleModuleRoot = {
8     .module = "sample",
9     .device0 = {
10        .deviceName = "foo",
11        .regBase = 0xff00,
12        .regOffset = 0x1,
13     },
14     .device1 = {
15        .deviceName = "bar",
16        .regOffset = 0x2,
17        .regBase = 0xff00,
```

Error message: None

FIG. 4I

DRIVER CONFIGURATION MANAGEMENT METHOD AND APPARATUS, MEDIUM, DEVICE, AND SYSTEM

CROSS-REFERENCE TO RELATED APPLICATIONS

This is a continuation of International Patent Application No. PCT/CN2021/110860 filed on Aug. 5, 2021, which claims priority to Chinese Patent Application No. 202010890830.1 filed on Aug. 29, 2020 and Chinese Patent Application No. 202110112587.5 filed on Jan. 27, 2021. All of the aforementioned patent applications are hereby incorporated by reference in their entireties.

TECHNICAL FIELD

This application relates to the field of communications technologies, and in particular, to a driver configuration management method and apparatus, a medium, a device, and a system.

BACKGROUND

With rapid development of Internet of things (IoT) intelligent devices, forms of the IoT devices are increasingly diversified and operating systems are emerging one after another. In this case, developers need to develop device drivers (drivers) applicable to the IoT devices.

Considering factors such as costs and low power consumption, a hardware platform used by the IoT devices usually has only very limited hardware resources. For example, performance of a read-only memory (ROM), a random-access memory (RAM), and a central processing unit (CPU) is very limited. Therefore, hardware-related configuration code in a driver of a current IoT device is generally directly written in driver implementation code by using a macro or a constant. To adapt to a new platform, driver code usually needs to be copied again and configuration code in the driver code needs to be modified. This causes code architecture corruption, reduces code maintainability and portability, and increases code reuse difficulty. Therefore, the hardware-related configuration code and function code in the driver implementation code need to be decoupled, so that the driver can focus more on service functions of the device, and porting and configuration management are easier.

SUMMARY

Embodiments of this application provide a driver configuration management method and apparatus, a medium, and a device, so that driver configuration management can be implemented on limited hardware resources of a lightweight platform, and configuration management can support both the lightweight platform and a fullweight platform.

According to a first aspect, an embodiment of this application provides a driver configuration management method, applied to a management device, including: determining target information, where the target information is used to represent a computing capability of an electronic device; converting, based on the target information, a configuration source file into a target configuration file that uses a target file format; and sending the target configuration file to the electronic device. Specifically, the target information may represent whether the electronic device is a lightweight device or a fullweight device, for example, represent an electronic device 100b or an electronic device 100a in the following. The target information is information about the computing capability of the electronic device, or is a compilation argument indicating the following target file format. For example, the target file format may be a C language format or a binary format in the following descriptions. The target file format may be a file format that meets the computing capability of the electronic device. In this way, in a driver configuration process, performance of the lightweight device can be ensured, and high flexibility and a complete hardware topology structure description capability of the fullweight device can also be implemented.

In a possible implementation of the first aspect, when the computing capability represented by the target information is a first-type computing capability, the target configuration file supports direct invoking of driver implementation code of the electronic device. Specifically, the first-type computing capability represents a computing capability of the lightweight device, and indicates that the current electronic device is the lightweight device. In this case, a selected compilation argument is a compilation argument corresponding to the lightweight device. In other words, the determined target information corresponds to the lightweight device. In this case, the target configuration file that uses the target file format usually occupies small storage space, so that the driver implementation code in the electronic device can be directly invoked, and a driver configuration can be implemented when performance of the electronic device (for example, the lightweight device) is ensured.

In a possible implementation of the first aspect, the target file format is implemented by using at least one of the following languages: a C language, a C++ language, and a Java language. For example, the target file format is a C language format in the following. In this case, a used language is the C language.

In a possible implementation of the first aspect, the sending the target configuration file to the electronic device includes: outputting the target configuration file to a read-only storage area in the electronic device. In this way, it can be ensured that the target configuration file is secure and cannot be easily tampered with.

In a possible implementation of the first aspect, after the converting, based on the target information, a configuration source file into a target configuration file that uses a target file format, the method further includes: compiling the driver implementation code of the electronic device based on the target configuration file; and outputting a file of the driver implementation code to a readable and writable storage area in the electronic device. In this way, an argument or a function in the driver implementation code corresponds to the target configuration file, and subsequently, the target configuration file can be directly invoked by using the driver implementation code.

In a possible implementation of the first aspect, when the computing capability represented by the target information is a second-type computing capability, the target file format is a binary format. The second-type computing capability represents a computing capability of the fullweight device, and indicates that the current electronic device is the fullweight device. In this case, a selected compilation argument is a compilation argument corresponding to the fullweight device. In other words, the determined target information corresponds to the fullweight device.

In a possible implementation of the first aspect, the target configuration file is obtained by the management device through compilation based on a predefined bytecode rule, and the target configuration file supports invoking by the electronic device by using the driver implementation code after the electronic device performs parsing based on the predefined bytecode rule. It may be understood that, a bytecode reserves a configured topology structure to a maximum extent, so that various traversal operations can be conveniently performed during parsing. Compared with a generated C language configuration file, the bytecode also has slightly higher RAM and ROM overheads of the electronic device, and is more applicable to an environment that does not have an ultimate requirement on performance, that is, applicable to the fullweight device.

In a possible implementation of the first aspect, the computing capability of the electronic device includes at least one of the following: a clock frequency of a processor in the electronic device, a capacity of a RAM of the electronic device, and a capacity of a ROM of the electronic device. For example, the RAM and the ROM of the electronic device may be a RAM and a ROM in the processor of the electronic device.

In a possible implementation of the first aspect, the determining target information includes: receiving a target operation performed by a user on a target control, where the target control is used to trigger selection of one piece of information from at least two pieces of information, and the at least two pieces of information are in a one-to-one correspondence with at least two file formats; and in response to the target operation, determining the information selected by the target control as the target information. The target control may be a compilation argument option 411 in the following. For example, a "binary configuration" selected by the compilation argument option 411 corresponds to the binary format (which is a file format), and a "C language configuration" selected by the compilation argument option 411 corresponds to the C language format (which is a file format).

In a possible implementation of the first aspect, the converting, based on the target information, a configuration source file into a target configuration file using a target file format includes: converting the configuration source file into a plurality of syntax unit sequences; verifying whether the plurality of syntax unit sequences meet a predefined syntax rule (for example, to check whether there is a syntax error in the plurality of syntax unit sequences); when the plurality of syntax unit sequences meet the predefined syntax rule, converting the plurality of syntax unit sequences into an abstract syntax tree; updating the abstract syntax tree based on a first syntax rule, where the first syntax rule includes at least a redefinition check and reference expansion processing; and converting, based on the target information, the abstract syntax tree into the target configuration file that uses the target file format. The predefined syntax, the first syntax rule, and the like may be determined by a person skilled in the art in advance based on an actual requirement. This is not specifically limited in this embodiment of this application.

According to a second aspect, an embodiment of this application provides a driver configuration management method, applied to an electronic device and including: obtaining a target configuration file in a target file format, where the target file format corresponds to a computing capability of the electronic device; and configuring and driving hardware in the electronic device based on the target configuration file. Specifically, the obtaining, by the electronic device, the target configuration file may be receiving the target configuration file from a management device.

In a possible implementation of the second aspect, the configuring and driving hardware in the electronic device based on the target configuration file includes: when the computing capability is a first-type computing capability, invoking the target configuration file by using driver implementation code, to configure and drive the hardware in the electronic device.

In a possible implementation of the first aspect, the target file format is implemented by using at least one of the following languages: a C language, a C++ language, and a Java language.

In a possible implementation of the second aspect, the target configuration file is stored in a read-only storage area of the electronic device.

In a possible implementation of the second aspect, the method further includes: obtaining the driver implementation code of the electronic device, where the driver implementation code is obtained through compilation based on the target configuration file, and the driver implementation code is stored in a readable and writable storage area in the electronic device.

In a possible implementation of the second aspect, the configuring and driving hardware in the electronic device based on the target configuration file includes: when the target file format is a binary format, parsing the target configuration file into a configuration tree based on a predefined bytecode rule, and invoking the configuration tree by using the driver implementation code of the electronic device, to configure and drive the hardware in the electronic device.

In a possible implementation of the second aspect, the computing capability of the electronic device includes at least one of the following: a clock frequency of a processor in the electronic device, a capacity of a RAM of the electronic device, and a capacity of a ROM of the electronic device.

Similarly, for descriptions in the second aspect, refer to related descriptions in the first aspect. Details are not described herein again.

According to a third aspect, an embodiment of this application provides a driver configuration management apparatus. The apparatus may be used in a management device, and includes: a determining module configured to configured to determine target information, where the target information is used to represent a computing capability of an electronic device; a conversion module configured to convert, based on the target information determined by the determining module, a configuration source file into a target configuration file that uses a target file format; and a sending module configured to send the target configuration file obtained by the conversion module through conversion to the electronic device.

In a possible implementation of the third aspect, when the computing capability represented by the target information is a first-type computing capability, the target configuration file supports direct invoking of driver implementation code of the electronic device.

In a possible implementation of the third aspect, the target file format is implemented by using at least one of the following languages: a C language, a C++ language, and a Java language.

In a possible implementation of the third aspect, the sending module is further configured to output the target configuration file to a read-only storage area in the electronic device.

In a possible implementation of the third aspect, the driver configuration management apparatus further includes a compilation module configured to: after the conversion module converts, based on the target information, the configuration source file into the target configuration file that uses the target file format, compile the driver implementation code of the electronic device based on the target configuration file. The sending module is further configured to output a file of the driver implementation code to a readable and writable storage area in the electronic device.

In a possible implementation of the third aspect, when the computing capability represented by the target information is a second-type computing capability, the target file format is a binary format.

In a possible implementation of the third aspect, the target configuration file is obtained by the management device through compilation based on a predefined bytecode rule, and the target configuration file supports invoking by the electronic device by using the driver implementation code after the electronic device performs parsing based on the predefined bytecode rule.

In a possible implementation of the third aspect, the computing capability of the electronic device includes at least one of the following: a clock frequency of a processor in the electronic device, a capacity of a RAM of the electronic device, and a capacity of a ROM of the electronic device.

In a possible implementation of the third aspect, determining the target information includes: receiving a target operation performed by a user on a target control, where the target control is used to trigger selection of one piece of information from at least two pieces of information, and the at least two pieces of information are in a one-to-one correspondence with at least two file formats; and in response to the target operation, determining the information selected by the target control as the target information.

In a possible implementation of the third aspect, the conversion module is further configured to: convert the configuration source file into a plurality of syntax unit sequences; verify whether the plurality of syntax unit sequences meet a predefined syntax rule; when the plurality of syntax unit sequences meet the predefined syntax rule, convert the plurality of syntax unit sequences into an abstract syntax tree; update the abstract syntax tree based on a first syntax rule, where the first syntax rule includes at least a redefinition check and reference expansion processing; and convert, based on the target information, the abstract syntax tree into the target configuration file that uses the target file format.

According to a fourth aspect, an embodiment of this application provides a driver configuration management apparatus. The apparatus may be used in an electronic device, and includes: an obtaining module configured to obtain a target configuration file that uses a target file format, where the target file format corresponds to a computing capability of the electronic device; and a configuration module configured to configure and drive hardware in the electronic device based on the target configuration file obtained by the obtaining module.

In a possible implementation of the fourth aspect, configuring and driving the hardware in the electronic device based on the target configuration file includes: when the computing capability is a first-type computing capability, invoking the target configuration file by using driver implementation code, to configure and drive the hardware in the electronic device.

In a possible implementation of the first aspect, the target file format is implemented by using at least one of the following languages: a C language, a C++ language, and a Java language.

In a possible implementation of the fourth aspect, the target configuration file is stored in a read-only storage area of the electronic device.

In a possible implementation of the fourth aspect, the obtaining module is further configured to obtain the driver implementation code of the electronic device, where the driver implementation code is obtained through compilation based on the target configuration file, and the driver implementation code is stored in a readable and writable storage area in the electronic device.

In a possible implementation of the fourth aspect, the configuration module is further configured to: when the target file format is a binary format, parse the target configuration file into a configuration tree based on a predefined bytecode rule, and invoke the configuration tree by using the driver implementation code of the electronic device, to configure and drive the hardware in the electronic device.

In a possible implementation of the fourth aspect, the computing capability of the electronic device includes at least one of the following: a clock frequency of a processor in the electronic device, a capacity of a RAM of the electronic device, and a capacity of a ROM of the electronic device.

According to a fifth aspect, an embodiment of this application provides a computer-readable medium. The computer-readable medium stores instructions. When the instructions are executed on an electronic device, the electronic device is enabled to perform the driver configuration management method in any one of the first aspect and the possible implementations of the first aspect, or the driver configuration management method in any one of the second aspect and the possible implementations of the second aspect.

According to a sixth aspect, an embodiment of this application provides an electronic device, including: a memory configured to store instructions, and a processor configured to execute the instructions to implement the driver configuration management method in any one of the first aspect and the possible implementations of the first aspect (in this case, the electronic device in the sixth aspect is the management device described in this specification), or the driver configuration management method in any one of the second aspect and the possible implementations of the second aspect (in this case, the electronic device in the sixth aspect is an electronic device that uses a driver configuration and that is managed by the management device).

BRIEF DESCRIPTION OF DRAWINGS

FIG. 3 is a schematic diagram of code of a binary configuration file according to some embodiments of this application;

FIG. 4A is a schematic diagram of a driver configuration interface according to some embodiments of this application;

FIG. 4C is a schematic diagram of a driver configuration interface according to some embodiments of this application;

FIG. 4D is a schematic diagram of a driver configuration interface according to some embodiments of this application;

FIG. 4E is a schematic diagram of a driver configuration interface according to some embodiments of this application;

FIG. 4F is a schematic diagram of a driver configuration interface according to some embodiments of this application;

FIG. 4G is a schematic diagram of a driver configuration interface according to some embodiments of this application;

FIG. 4H is a schematic diagram of a driver configuration interface according to some embodiments of this application;

FIG. 4I is a schematic diagram of a driver configuration interface according to some embodiments of this application;

DESCRIPTION OF EMBODIMENTS

Figure 1:
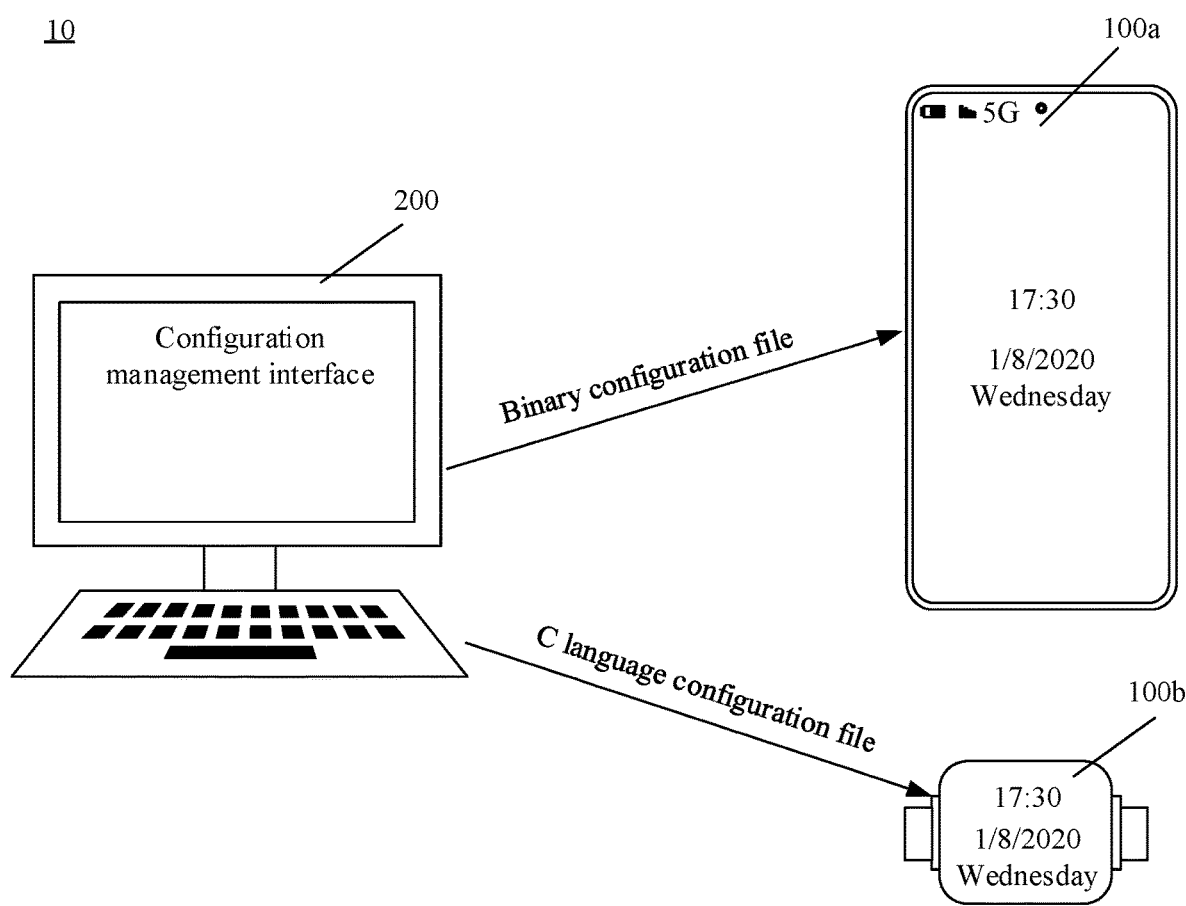
FIG. 1 is a schematic diagram of a structure of a driver configuration management system according to some embodiments of this application.

Illustrative embodiments of this application include but are not limited to a driver configuration management method and apparatus, a medium, and a device.

The driver configuration management method provided in embodiments of this application is applied to a scenario in which driver configuration management is performed on an electronic device. The electronic device may invoke a driver through an operating system to configure hardware, and drive the hardware to work, for example, configure and drive hardware such as a graphics card, an audio card, a scanner, a camera, and a modem to work. Further, the electronic device generally needs to obtain a configuration file, and configures related hardware through the driver by using the configuration file, to drive the hardware to work. The electronic device in embodiments of this application may include a lightweight device or a fullweight device, but is not limited thereto. In addition, the operating system may include but is not limited to a Linux system, an Android system, and the like.

It should be noted that, the lightweight device provided in embodiments of this application generally uses a microprocessor (for example, an ARM Cortex-M series microprocessor) with ultra-low power consumption, long standby time, and low costs. This type of processor generally has a low clock frequency, a small RAM, and a small ROM. For example, capacities of the RAM and the ROM are generally at a level of K to M. The following uses a lightweight platform to represent such a processor platform. Certainly, the lightweight device in embodiments of this application includes but is not limited to the foregoing IoT device, a band, and another device. In addition, a lightweight environment refers to an environment or a system that includes one or more lightweight devices and a management device that interacts with the lightweight devices. For example, the management device is configured to deliver a configuration file related to a hardware configuration to the lightweight devices.

The fullweight device (or referred to as a heavyweight device) provided in embodiments of this application usually has a battery with a large capacity, does not need to have ultra-low power consumption, and needs to have high performance to ensure user experience. Further, the fullweight device generally uses a microprocessor with high performance (for example, an ARM Cortex-A series microprocessor). This type of processor generally has a RAM and a ROM (generally at a level of G or above) with large capacities. The following uses a fullweight platform to represent such a processor platform. Certainly, the fullweight device in embodiments of this application includes but is not limited to a mobile phone or tablet computer. In addition, the lightweight environment refers to an environment or a system that includes one or more fullweight devices and a management device that interacts with the fullweight devices. For example, the management device may be configured to deliver a configuration file related to a hardware configuration to the fullweight devices.

Further, the lightweight device and the fullweight device in this application may be measured by using a computing capability of the electronic device. In some embodiments, the computing capability of the electronic device includes at least one of the following: a clock frequency of a processor in the electronic device, a capacity of a RAM of the processor, or a capacity of a ROM of the processor. It may be understood that a higher clock frequency of the processor, a larger capacity of a RAM of the electronic device, and a larger capacity of a ROM of the electronic device indicate a stronger computing capability of the electronic device, and correspond to the fullweight device; and a lower clock frequency of the processor, a smaller capacity of the RAM of the electronic device, and a smaller capacity of the ROM of the electronic device indicate a poorer computing capability of the electronic device, and correspond to the lightweight device. In addition, the computing capability of the electronic device may alternatively be represented by a model of the processor in the electronic device. For example, the lightweight device is represented by a model of the ARM Cortex-M series microprocessor, and the fullweight device is represented by a model of the ARM Cortex-A series microprocessor.

In a possible implementation, the processor and a memory (the RAM or the ROM) in the electronic device are separately implemented by using independent modules. In this case, a RAM and a ROM that measure the computing capability of the electronic device may be referred to as the RAM and the ROM of the electronic device.

In another possible implementation, when the electronic device is implemented by using an integrated module, if the processor and a memory (the RAM or the ROM) in the electronic device are integrated in a chip or system by using the integrated module, the RAM and the ROM in the electronic device may also be considered as the RAM and the ROM of the processor.

A management device 200 applicable to this application may be a server, a desktop computer, a notebook computer, or the like. It may be understood that, in some embodiments, the server may be a hardware server, or may be embedded in a virtualized environment. For example, according to some embodiments of this application, the server may be a virtual machine executed on a hardware server including one or more other virtual machines, namely, a cloud server. An electronic device 100*a* and an electronic device 100*b* may communicate with the management device 200 in various wired connection manners, or perform wireless communication with the management device 200 in various wireless manners.

In a solution of the related technology, driver management of the electronic device may be implemented by using a device tree source (DTS). The DTS is a configuration management framework that describes a device hardware topology and a hardware resource configuration in the Linux system. Further, a typical application of the DTS in the Linux system is as follows: Text source code of the DTS is compiled into a device tree blob (DTB) file in a binary format by a compiler in a compilation phase. When the Linux system is started, the electronic device transfers a start position of the DTB file as an argument to a kernel by using a bootloader, and each module of the kernel may read configuration content in the DTB file through parsing. However, the DTB file and code for parsing the DTB file need to occupy a large quantity of ROM and/or RAM overheads in the electronic device, and may not be carried by the lightweight device such as the IoT device. Consequently, the DTS may not be used for driver configuration management of the lightweight device.

In another solution of the related technology, driver configuration management of the electronic device may be implemented by using an advanced configuration and power interface (ACPI). The ACPI is a configuration management framework widely used in an X86 system. Further, the ACPI describes a hardware resource and a control method by using an ACPI source language (ASL), and compiles an ASL file into an ACPI machine language (AML) binary file by using a compiler. When the system of the electronic device is started, the AML binary file is loaded by using an AML interpreter. The system may invoke an AML parser interface to parse a configuration or execute control interface code. However, the ASL is more complex than the DTB in terms of configuration syntax, and has higher learning costs for developers. In addition, the AML file and the AML parser have large memory (such as ROM and/or RAM) overheads, and are mainly applied to a computer platform of an X86 architecture, but not applicable to the lightweight device.

Therefore, neither of the foregoing two solutions in the related technology is applicable to the lightweight device. To resolve this problem, embodiments of this application provide a driver configuration management method, so that driver configuration management can be implemented on limited hardware resources of the lightweight platform, and a configuration management framework can support both the lightweight platform and the fullweight platform.

Further, embodiments of this application provide a driver configuration management method, where a set of configuration description syntax for configuration files is defined, and unified configuration description syntax may be used to separately generate, for electronic devices with different performance or power consumption requirements, configuration files that meet the performance and power consumption requirements. For example, a configuration file in a C language format (referred to as a C language configuration file in the following, that is, the configuration file is C language code) may be generated in the lightweight environment, so that a driver in the lightweight device such as the IoT device or the band directly invokes the C language code to obtain a hardware-related configuration, thereby avoiding overheads of storing and parsing the configuration file by the lightweight device, and ensuring high performance of the lightweight device. A configuration file in a binary format (referred to as a binary configuration file in the following) may be generated in the fullweight environment, so that a driver in the fullweight device such as the mobile phone or the tablet computer may obtain a hardware-related configuration through a configuration parsing interface provided by a configuration framework, and a mode of obtaining the configuration by using the configuration parsing interface has a complete hardware description capability. Therefore, in the foregoing driver configuration management process, not only performance of the lightweight device is ensured, but also high flexibility and a complete hardware topology structure description capability of the fullweight device are implemented.

In this way, this application has the following advantages: First, portability and maintainability of driver implementation code are improved, and a driver service is decoupled from a configuration (for example, the driver implementation code is decoupled from the configuration file). The driver implementation code can be ported or adapted to a new platform through code modifying. Second, in this application, one set of configuration description syntax may be used to generate configuration files in different file formats. Therefore, a reuse capability of configuration source code of the configuration files is improved, one set of code may support a plurality of platforms (for example, the following lightweight platform and fullweight platform), and configurations of different platforms may be adaptive.

The following further describes embodiments of this application in detail with reference to the accompanying drawings.

As shown in FIG. 1, some embodiments of this application provide a driver configuration management system 10. The system 10 includes an electronic device 100*a*, an electronic device 100*b*, and a management device 200. Further, the management device 200 is configured to separately send, to each of the electronic device 100*a* and the electronic device 100*b*, a configuration file that meets performance and power consumption of the receiving device.

In some embodiments, the electronic device 100*a* may be a fullweight device, and the electronic device 100*b* may be a lightweight device. For example, in FIG. 1, only an example in which the electronic device 100*a* is a mobile phone, the electronic device 100*b* is a band, and the management device 200 is a desktop computer is used. In this case, according to some embodiments of this application, the management device 200 may send, to the electronic device 100a, a configuration file that meets performance and power consumption of the fullweight device, for example, a binary configuration file; and send, to the electronic device 100b, a configuration file that meets performance and power consumption of the lightweight device, for example, a C language configuration file. In addition, the system 10 shown in FIG. 1 may include any quantity of electronic devices, and is not limited to one lightweight device (namely, the electronic device 100b) and one fullweight device (namely, the electronic device 100a) shown in FIG. 1.

It may be understood that the management device 200 applicable to this application may be a server, a desktop computer, a notebook computer, or the like. In some embodiments, the server may be a hardware server, or may be embedded in a virtualized environment. For example, according to some embodiments of this application, the server may be a virtual machine executed on a hardware server including one or more other virtual machines, namely, a cloud server. The electronic device 100a and the electronic device 100b may communicate with the management device 200 in various wired connection manners, or perform wireless communication with the management device 200 in various wireless manners. This is not specifically limited in this embodiment of this application.

According to some embodiments of this application, the management device 200 in the driver configuration management system 10 may include a configuration compiler 201 configured to generate configuration files in different formats for electronic devices with different performance and power consumption by using unified configuration description syntax. It may be understood that the management device 200 may select a compilation argument (or referred to as target information) based on a computing capability of the electronic device, that is, select a target file format of a configuration file of the electronic device. It may be understood that the computing capability of the electronic device may be represented by using the compilation argument. Further, a system framework of the driver configuration management system 10 may be divided into a configuration compilation phase and a configuration usage phase based on compilation and usage of the configuration file. It may be understood that, in the configuration compilation phase, the management device 200 may generate a configuration file in a corresponding format (or referred to as a file format) based on a specified compilation argument by using the configuration compiler. The compilation argument corresponds to the performance and power consumption of the electronic device. In addition, the configuration usage phase may be implemented by the electronic device 100a and the electronic device 100b in the system 10. Further, these electronic devices obtain the configuration files from the management device 200, and configure and drive hardware.

In some embodiments, the management device 200 may independently determine the computing capability of the electronic device, and then select the compilation argument. For example, after establishing a connection to the electronic device, the management device 200 may capture information about the computing capability of the electronic device, including but not limited to a clock frequency of a processor in the electronic device, a capacity of a RAM of the processor, a capacity of a ROM of the processor. For example, the information may alternatively be information such as a battery capacity or a processor model of the electronic device. In addition, after the management device 200 establishes the connection to the electronic device, the electronic device may alternatively actively report the information about the computing capability of the electronic device to the management device.

In an example, when selecting a compilation argument based on a computing capability of the electronic device 100b, the management device 200 may determine that the computing capability is a first-type computing capability, and the first-type computing capability represents a computing capability of the lightweight device. In this case, the selected compilation argument is a compilation argument corresponding to the lightweight device, and a file format corresponding to the compilation argument is a text format (namely, a first language format). Similarly, when the management device 200 selects a compilation argument based on a computing capability of the electronic device 100a, if it is determined that the computing capability is a second-type computing capability, and the second-type computing capability represents a computing capability of the fullweight device, the selected compilation argument is a compilation argument corresponding to the fullweight device. In this case, a file format corresponding to the selected compilation argument may be a binary format.

In addition, in some embodiments, the management device 200 may select a compilation argument, that is, determine the computing capability of the electronic device, in response to an operation of a user, to further select a file format corresponding to the compilation argument. In this case, the computing capability of the electronic device is determined by the user, so that the user may manually select, on a user interface provided by the management device 200, the compilation argument that represents the computing capability of the electronic device. In the following embodiments of this application, a compilation argument is mainly selected by using an operation of the user, to select a file format for generating a final configuration file. A specific implementation is described below, and details are not described herein.

Figure 2:
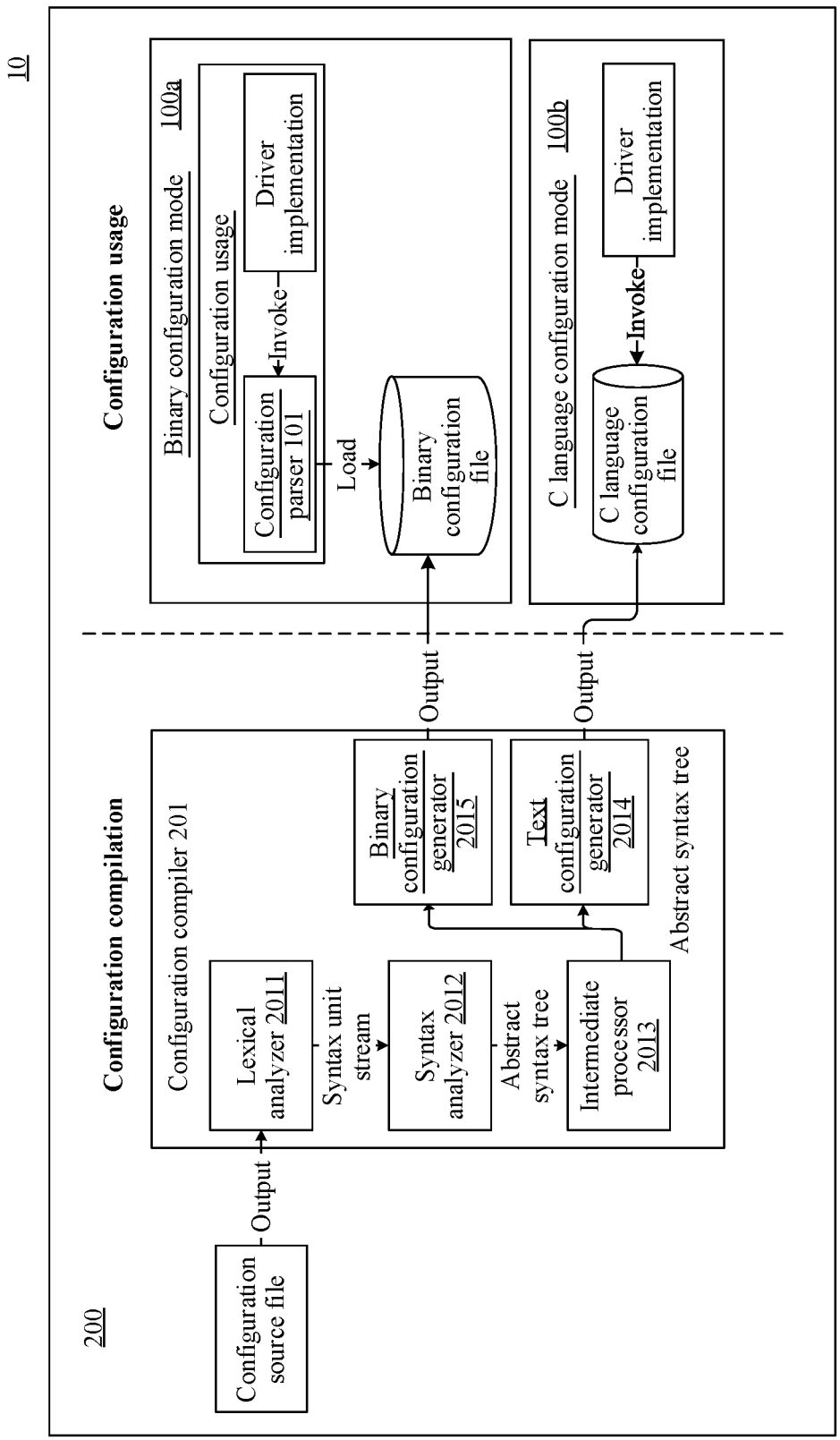
FIG. 2 is a schematic diagram of a structure of a driver configuration management system according to some embodiments of this application.

More specifically, in some example embodiments, as shown in FIG. 2, the management device 200 includes the configuration compiler 201, and the configuration compiler is a tool for converting a text of a configuration source file into a required output format (for example, the binary format or a C language format). The configuration compiler 201 includes a lexical analyzer 2011, a syntax analyzer 2012, an intermediate processor 2013, a text configuration generator (for example, a C language configuration generator) 2014, and a binary configuration generator 2015. Further, in the configuration compilation phase, after the configuration source file is parsed into an abstract syntax tree after sequentially passing through the lexical analyzer 2011 and the syntax analyzer 2012, the configuration compiler 201 expands syntax in the abstract syntax tree by using the intermediate processor 2013 to generate a final abstract syntax tree. For example, in a fullweight environment, the configuration compiler 201 processes the final abstract syntax tree into a binary configuration file by using the binary configuration generator 2015, and outputs the binary configuration file to the electronic device 100a. In a lightweight environment, the configuration compiler 201 processes the final abstract syntax tree into a C language configuration file by using the text configuration generator 2014, and outputs the C language configuration file to the electronic device 100b.

Still refer to FIG. 2. The electronic device 100a may include a configuration parser 101, and the configuration parser 101 is configured to parse the binary configuration file into a configuration tree. In the configuration usage phase, in the fullweight environment, driver implementation code of the electronic device 100*a* parses a topology structure of the configuration tree by using a read interface of the configuration parser 101, and reads configuration attribute content in the configuration tree. In addition, in the lightweight environment, driver implementation code of the electronic device 100*b* directly invokes a function interface and a structure definition in the C language configuration file to obtain configuration content related to the hardware.

According to some embodiments of this application, with reference to the management device 200, the electronic device 100*a*, and the electronic device 100*b* that are shown in FIG. 2, the following describes in detail each part in the configuration compilation phase and the configuration usage phase that are related to the driver configuration management system 10.

1. Configuration Source File:

The configuration source file is a configuration source code file organized based on configuration description syntax. The configuration description syntax is a text format with key-value (namely, key-value) as a main body designed to facilitate configuration management. Code in the configuration source file may be referred to as configuration source code. Further, the configuration source file is used to describe a configuration of each piece of hardware in the electronic device. For example, the configuration source file is used to describe, in the electronic device, whether a front-facing camera is enabled and which function (or permission) is enabled, whether a rear-facing camera is enabled and which function is enabled, whether a touchscreen is enabled and which function is enabled, and the like.

In some embodiments, the configuration source file is further used to describe information about one or more pieces of hardware, for example, information such as a name of each piece of hardware, a register base address, and a register offset. It may be understood that registers of some hardware in the electronic device are used for a special purpose, and accessing a register of specific hardware by the electronic device may cause bottom-layer hardware to perform a corresponding operation. For example, the electronic device accesses a register of the front-facing camera to perform corresponding configuration and driving on the front-facing camera.

In an example, the configuration source code in the configuration source file provided in this embodiment of this application includes information about a device 0 and information about a device 1 in the electronic device, and further includes the following fields:

```
root {
    module = "sample";
    device0 { // Device 0
        deviceName = "foo"; // Name of the device 0
        regBase = 0xff00; // Register base address
        regOffset = 0x1; // Register offset
    }
    device1: device0 {// A configuration of the device 1
    is first copied from a
configuration of the device 0
        deviceName = "bar"; // Name of the device 1
        regOffset = 0x2; // Register offset
    }
}
```

Further, in the configuration source code in the foregoing example, two fields are respectively used to represent the device 0 and the device 1. In the configuration source code in the foregoing example, content before each symbol "//" is code itself, and content after each symbol "//" is a description of the code.

For example, "device0" is used to represent the device 0. For example, the device 0 may be the front-facing camera of the electronic device. In the code segment device0{ }, code "deviceName="foo";" is used to indicate that the name of the device 0 is foo, and a data type of "foo" is a character; code "regBase=0xff00;" is used to indicate that the register base address of the device 0 in the electronic device is 0xff00, and a data type of 0xff00 is a hexadecimal value; and code "regOffset=0x1;" is used to indicate that the register offset of the device 0 is 0x1, and a data type of 0x1 is a hexadecimal value.

In addition, "device1" is used to represent the device 1. For example, the device 1 may be the rear-facing camera in the electronic device. First, code "device1: device0" is used to indicate that the configuration of the device 1 is copied from the configuration of the device 0. For example, a register base address of the device 1 is copied from the register base address of the device 0, that is, the register base address of the device 1 is also 0xff00. Second, in the code segment device1: device0{ }, code "deviceName="bar";" is used to indicate that the name of the device 1 is bar, and a data type of "bar" is a string; and code "regOffset=0x2;" is used to indicate that the register offset of the device 1 is 0x2, and a data type of 0x2 is a hexadecimal value.

In addition, code "module="sample";" shown in the configuration source code in the foregoing example is used to indicate a module or a device described in the configuration source file, for example, used to indicate the electronic device 100*a* or the electronic device 100*b* that needs to obtain a configuration file.

In addition, the configuration source code in the example is used as an example to describe a key-value text format represented by the configuration description syntax. For example, the code "module="sample";", the code "deviceName="foo";", and the code "regBase=0xff00"; are all in the key-value text format. In the code "module="sample";", "module" is a key and "sample" is a value. In the code "regBase=0xff0;", regBase is a key and 0xff0 is a value.

2. Related Descriptions of Each Component in the Configuration Compiler 201:

(1) Lexical Analyzer 2011:

A function of the lexical analyzer 2011 is to read strings (or referred to as file descriptors) in the configuration source file, convert the strings into syntax unit sequences one by one, and then output the syntax unit sequences to the syntax analyzer 2012 for use. For example, the syntax units may include but are not limited to data types such as a string, a bracket, and a keyword.

In an example, the code "module="sample";" in the configuration source code shown above is used as an example to describe a working process of the lexical analyzer 2011. Further, for the code "module="sample";", the lexical analyzer 2011 may analyze and output a syntax unit sequence including the following four syntax units:

{type: text, value: module}, {type: symbol, value: =};
{type: string, value: sample}, {type: symbol, value::}.

It may be understood that in this embodiment of this application, "type" in the syntax unit represents a data type of a string, and "value" represents a value of the string. In addition, in this embodiment of this application, the syntax unit sequence output by the lexical analyzer 2011 may be referred to as a syntax unit stream or a token stream.

(2) Syntax Analyzer 2012:

The syntax analyzer (syntactic analysis, also referred to as parsing) 2012 is configured to perform a syntax check on the syntax unit sequences output by the lexical analyzer 2011, and verify whether these syntax unit sequences meet predefined description syntax, and can prompt a location and content of an error. In addition, the syntax analyzer 2012 is further configured to convert the syntax unit sequences into an abstract syntax tree (AST) that facilitates program processing, and transfer the abstract syntax tree to a subsequent processing module of the configuration compiler 201 for further processing. The abstract syntax tree may be referred to as a syntax tree for short.

Further, the abstract syntax tree in this embodiment of this application includes at least information such as a node name, an attribute, and an attribute value. The node, the attribute, and the attribute value correspond to different content in the configuration source code in the foregoing example. For example, different nodes may correspond to different code segments in the configuration source code in the foregoing example, and a group of attributes and attribute values may correspond to a group of key-values of code in each code segment in the configuration source code.

It may be understood that the abstract syntax tree is a tree-like representation of an abstract syntax structure of source code (for example, the configuration source code), and each node in the tree represents a structure of the source code. However, the abstract syntax tree does not represent every detail of actual syntax. For example, nested brackets (namely, "{ }") are hidden in a tree structure and are not presented in a form of a node.

In an example, for the configuration source code in the foregoing example, content of the abstract syntax tree generated by the lexical analyzer 2011 and the syntax analyzer 2012 is described as follows:

| CONFNODE | ForestRoot // Root node | | |
|---|---|---|---|
| CONFNODE | root | | |
| CONFTERM | module | | |
| STRING | \|_ | sample | |
| CONFNODE | device0 | | |
| CONFTERM | deviceName | | |
| STRING | \|_ | foo | |
| CONFTERM | regBase | | |
| UINT32 | \|_ | ff00 | |
| CONFTERM | regOffset | | |
| UINT8 | \|_ | 1 | |
| CONFNODE | device1 | NodeCopy | device0 |
| CONFTERM | deviceName | | |
| STRING | \|_ | bar | |
| CONFTERM | regOffset | | |
| UINT8 | \|_ | 2 | |

An abstract syntax tree provided in this application is described with reference to the abstract syntax tree in the foregoing example. For example, the abstract syntax tree may use "CONFNODE" to represent a node, "CONFTERM" to represent an attribute, and "STRING" to represent that a data type of an attribute value of a corresponding attribute is a character (or referred to as a string). "|_" is used to associate each attribute with a corresponding attribute value, a data type represented by "UINT32" is an unsigned 32-bit integer, and a data type represented by "UINT8" is an unsigned 8-bit integer.

It may be understood that, an attribute (CONFTERM) between two nodes (CONFNODE) in the abstract syntax tree in the foregoing example is an attribute in a previous node. For example, "CONFNODE ForestRoot" is a virtual root node "ForestRoot" constructed by the syntax analyzer 2012, and "CONFNODE root" represents a parent node "root", and corresponds to a code segment root{ } in the configuration source file. However, nested brackets ("{ }") are hidden in the tree structure, and are not presented in the form of a node. "CONFNODE device0" represents a child node "device0", and corresponds to the code segment device0{ } in the configuration source file. "CONFNODE device1 NodeCopy device0" represents a child node "device1", and corresponds to the code segment "device1: device0{ }" in the configuration source file.

In addition, content in lines 4 and 5 of the abstract syntax tree in the foregoing example represents an attribute module and an attribute value of the attribute being a string "sample". The two lines of code correspond to the code "module="sample";" in the configuration source file. For another example, content in lines 8 and 9 in the abstract syntax tree in the foregoing example represents an attribute regBase and an attribute value of the attribute being an unsigned 32-bit integer ff00. The two lines of code correspond to the code "regBase=0xff00;" in the configuration source file. Similarly, for descriptions of other attributes in the abstract syntax tree in the foregoing example, refer to descriptions of the attribute module and the attribute regBase. Details are not described herein again.

(3) Intermediate Processor 2013:

The intermediate processor 2013 is configured to process syntax that cannot be processed in the syntax analyzer 2012, for example, processing such as a redefinition check and reference expansion. After being processed by the intermediate processor 2013, the abstract syntax tree may be output to the subsequent binary configuration generator 2015 and the subsequent text configuration generator 2014.

In an example, for the abstract syntax tree output by the syntax analyzer 2012, the intermediate processor 2013 performs reference expansion, and outputs the following abstract syntax tree (denoted as a final abstract syntax tree):

| CONFNODE | root | |
|---|---|---|
| CONFTERM | module | |
| STRING | \|_ | sample |
| CONFNODE | device0 | |
| CONFTERM | deviceName | |
| STRING | \|_ | foo |
| CONFTERM | regBase | |
| UINT32 | \|_ | ff00 |
| CONFTERM | regOffset | |
| UINT8 | \|_ | 1 |
| CONFNODE | device1 | |
| CONFTERM | deviceName | |
| STRING | \|_ | bar |
| CONFTERM | regOffset | |
| UINT8 | \|_ | 2 |
| CONFTERM | regBase | |
| UINT32 | \|_ | ff00 |

Further, the intermediate processor 2013 performs reference expansion on the code "CONFNODE device1 NodeCopy device0" in the abstract syntax tree generated by the syntax analyzer 2012, to generate the final abstract syntax tree, so that the abstract syntax tree expands the attribute "regBase" in the node "device1", and a data type of the attribute is an unsigned 32-bit integer attribute value "ff00".

(4) Binary Configuration Generator 2015:

The binary configuration generator 2015 outputs the content of the abstract syntax tree as a binary configuration file based on a customized bytecode rule in this embodiment of this application. In some embodiments, a bytecode coding table provided in this application is shown in the Table.

TABLE

| Code value | Code name | Arguments | Description |
|---|---|---|---|
| 0x01 | Config node | Node name (String), length (DWord) | |
| 0x02 | Config term | Term name (String), term value | |
| 0x03 | NodeRef | HashCode (DWord) | |
| 0x04 | Array | Count (word), length (Dword), data | |
| 0x10 | Byte | Data (byte) | 8-bit data prefix |
| 0x11 | WORD | Data (word) | 16-bit data prefix |
| 0x12 | DWORD | Data (dword) | 32-bit data prefix |
| 0x13 | QWORD | Data (qword) | 64-bit data prefix |
| 0x14 | String | Ascii end of '\0' | String data prefix |

In the Table, "Code value" represents code values matching different types of code, "Code name" represents a code name, "Arguments" represents arguments, and "Description" is a supplementary description of the code. It may be understood that different types of code have different information such as code names and code values.

The following specifically describes each part in the Table.

(1) The code name "Config node" represents a node. A corresponding code value is "0x01". Corresponding arguments include a node name (Node Name) whose data type is a character (String) and a node length (Length) whose data type is a double word (Double Word, DWord). The node length is used to indicate a total quantity of bytes included in a node, and the DWORD double word is 4 bytes and in total 32 bits.

(2) The code name "Config term" represents an attribute. A corresponding code value is "0x02". Corresponding arguments include an attribute name (Term Name) whose data type is a character (String) and an attribute value (Term Value).

(3) The code name "NodeRef" represents a node configuration. A corresponding code value is "0x03". A corresponding argument includes hash code (HashCode) whose data type is DWord, to reference another node to quickly access content of the other node.

(4) The code name "Array" represents an array. A corresponding code value is "0x04". Corresponding arguments include a value (Count) whose data type is a word (Word), an array length (Length) whose data type is the double word (DWord), and array data (data).

(5) The code names "Byte", "WORD", "DWORD", and "QWORD" respectively represent a byte, a word, a double word, and a quad word. Corresponding code values are respectively "0x10", "0x11", "0x12", and "0x13". Corresponding arguments are respectively data (data) whose data types are the byte (byte), the word (word), the double word (dword), and the quad word (qword). Corresponding descriptions (Description) are respectively an 8-bit (bit) data prefix (8-bit data prefix), a 16-bit data prefix (16-bit data prefix), a 32-bit data prefix (32-bit data prefix), and a 64-bit data prefix (64-bit data prefix).

(6) The code name "String" represents a string. A corresponding code value is "0x14". A corresponding argument is an ascii code (ascii end of '\0') ending with '\0'(namely, 0x00), and a corresponding description is a string data prefix (string data prefix).

It may be understood that, in this embodiment of this application, the configuration compiler 201 may be implemented by compilation software. In some embodiments, the compilation software may provide a user interface (denoted as a configuration management interface), to present a process of compiling the configuration file by the configuration compiler 201 to a user. For example, the configuration source code, the abstract syntax tree, a syntax check result of the abstract syntax tree, and a compilation output result (for example, an output success or an output failure) of the final configuration file are displayed.

In an example, the binary configuration generator 2015 may generate, based on the customized bytecode rule, configuration code in a binary configuration file shown in FIG. 3 by using the abstract syntax tree obtained by the intermediate processor 2013 through processing. In addition, content shown in FIG. 3 not only includes the configuration code in the binary configuration file, but also includes marks indicating how characters in the configuration code are arranged and displayed and an explanation of each line of characters. All characters in the binary configuration file shown in FIG. 3 are hexadecimal values.

Further, numbers "1 to 11" in the leftmost column in the content shown in FIG. 3 are used to indicate a quantity of lines of code compiled in compilation software a in which the configuration compiler 201 is located. "Offset" in the first row is used to indicate a row sequence number and a column sequence number, of each character in the binary configuration file, that are displayed in the compilation software a shown in FIG. 3, for example, 16 column sequence numbers "00 01 02 03 . . . 0E 0F" shown in a first row in FIG. 3, and row sequence numbers "000000000 000000010 . . . 000000090 . . . " shown in a first column in FIG. 3. Sequence numbers of rows and sequence numbers of columns shown in FIG. 3 are used to facilitate a person skilled in the art to locate and query each piece of code in the binary configuration file. Further, the binary configuration file shown in FIG. 3 includes "0A A0 0A A0 . . . 00 FF 00 00 . . . ", and an arrangement sequence is a sequence from left to right and from top to bottom, namely, a sequence with column sequence numbers in ascending order and row sequence numbers in ascending order shown in FIG. 3. For example, a character "0A" indicated by a row sequence number "00" and a column sequence number "00000000" is a first character in the binary configuration file shown in FIG. 3.

It may be understood that, the row sequence number and the column sequence number displayed by the compilation software provided in this application include but are not limited to the example in FIG. 3. For example, 32 characters may be displayed in each row of the compilation software. In other words, 32 columns of sequence numbers are displayed in the compilation software.

In addition, in some embodiments, the binary configuration file shown in FIG. 3 is described in detail by using, as an example, all characters in the row sequences "00000000" and "00000010" in shown in FIG. 3, all characters in the row sequence "00000000", and characters whose column sequence numbers are "00 to 0D" in the row sequence "00000020". Further, with reference to the Table, these characters are described in the sequence from left to right and from top to bottom shown in FIG. 3: "0A A0 0A A0" is a magic number, and is used to check a file type, to be specific, used to check whether a current file is a binary configuration file that meets the bytecode coding rule shown in the Table and the like. "00 00 00 00" indicates a file check bit, and may be used to indicate whether the current file is secure or standard. "40 00 00 00" represents a main version number of a compiler, for example, a main version number of the compiler 201. "00 00 00 00" indicates a subversion number of the compiler. "8c 00 00 00" indicates a file size, that is, 140 (bytes). "01" indicates a node (Config Node). "72 6f6f 74 00" indicates a node name "root", where "72", "6f", "6f", and "74" are respectively ascii codes of "r", "o", "o", and "t", and "00" is an end character. "82 00 00 00" indicates a size of the node "root", that is, 130 bytes. "02" indicates an attribute (Config Term), namely, an attribute in the node "root". "6d 6f64 75 6c 65 00" indicates an attribute name "module", where "6d", "6f", "64", "75", "6c", and "65" are respectively ascii codes of "m", "o", "d", "u", "l", and "e", and 00 is an end character. "14" indicates a string (String). "73 61 6d 70 6c 65 00" indicates content "sample" of the string, where "73", "61", "6d", "70", "6c", and "65" are respectively ascii codes of "s", "a", "m", "p", "l", and "e", and 00 is an end character.

(5) Text Configuration Generator 2014:

In some embodiments, the text configuration generator 2014 is configured to generate, based on a C language or a C++ language, a language (such as a bottom-layer-oriented language) implementation that is small in file size and that is easy for compilation usage. In the following embodiments of this application, only an example in which the text configuration generator 2014 is a C language configuration generator is used for description.

According to some embodiments of this application, the text configuration generator 2014 is configured to generate, based on the content in the abstract syntax tree, a C language configuration file including a C language data structure and a function, so that the driver implementation code in the electronic device directly invokes the function and accesses a variable to obtain a configuration related to the hardware. To be specific, the C language configuration file includes a header file and a content file. Further, in some embodiments, the C language configuration file mainly includes configuration content stored as a structure and a configuration obtaining interface function generated for obtaining the configuration.

In an example, for the configuration source file and the abstract syntax tree in the foregoing example, an example of the header file in the C language configuration file generated by the text configuration generator 2014 is as follows:

```
/*
 * It's HDF config auto-gen file, do not modify it manually
 */
#ifndef HCS_CONFIG_SAMPLE_HEADER_H
#define HCS_CONFIG_SAMPLE_HEADER_H
#include <stdint.h>
struct HdfConfigSampleDevice0 {
    const char* deviceName;
    uint16_t regBase;
    uint8_t regOffset;
},
struct HdfConfigSampleDevice1 {
    const char* deviceName;
    uint8_t regOffset;
    uint16_t regBase;
},
struct HdfConfigSampleRoot {
    const char* module;
    struct HdfConfigSampleDevice0 device0;
    struct HdfConfigSampleDevice1 device1;
},
Const struct HdfConfigSampleRoot* HdfGetSampleModuleConfigRoot (void);
#endif // HCS_CONFIG_SAMPLE_HEADER_H
```

It should be noted that "#ifndef", "#define", and "#endif" in the header file are one type of macro definition. The condition indicator #ifndef is used to check whether a precompiled constant (namely, "HCS_CONFIG_SAMPLE_HEADER_H") is defined by a macro. If the constant is not defined by the macro, a value of the condition indicator #ifndef is true, and all statements from #ifndef to #endif are included for compilation. Conversely, if the value of the condition indicator is false, the statements between the #ifndef and #endif indicators are ignored. A main purpose of the condition indicator #ifndef is to prevent repeated inclusion and compilation of the header file.

It may be understood that the header file includes a configuration structure declaration (or referred to as a structure declaration) and a configuration obtaining function declaration (or referred to as a function declaration). For example, the configuration structure declaration defined in the header file includes struct HdfConfigSampleDevice0, struct HdfConfigSampleDevice1, and struct HdfConfigSampleDRoot. The configuration obtaining function declaration in the header file may be the function "const struct HdfConfigSampleRoot*HdfTetSampleModuleConfigRoot (void)".

Further, first, the header file in the C language configuration file is used to declare arguments and variables. For example, in the structure struct HdfConfigSampleDevice0, the following arguments are declared for the device 0: a device name "deviceName" whose data type is a constant string (const char*), a register base address (regBase) whose data type is a 16-bit unsigned integer (uint16_t), and a register base address (regOffset) whose data type is an 8-bit unsigned integer (uint8_t). The arguments separately correspond to corresponding attributes of the device 0 in the configuration source file and the abstract syntax tree in the foregoing example. Similarly, in this embodiment of this application, descriptions of arguments defined in the structure struct HdfConfigSampleDevice1 are not described herein again. Second, in the structure struct HdfConfigSampleRoot, a "module" whose data type is a constant string is defined, and "HdfConfigSampleDevice0 device0" corresponding to the device 0 and "struct HdfConfigSampleDevice1 device1" corresponding to the device 1 are defined. In addition, the header file further includes content "It's HDF config auto-gen file, do not modify it manually" for interpretation, to explain to related technical personnel that the header file is a file automatically generated by an HDF configuration, and manual modification is not allowed. HDF represents a hardware driver foundation.

In an example, for the configuration source file and the abstract syntax tree in the foregoing example, an example of the content file in the C language configuration file of the text configuration generator 2014 is as follows:

```
/*
 * It's HDF config auto-gen file, do not modify it manually
 */
#include "sample.h"
static const struct HdfConfigSampleRoot
```

-continued

```
g_hdfConfigSampleModuleRoot = {
    .module = "sample",
    .device0 = {
        .deviceName = "foo",
        .regBase = 0xf00,
        .regOffset = 0x1,
    },
    .device1 = {
        .deviceName = "bar",
        .regOffset = 0x2,
        .regBase = 0xf00,
    },
};
const struct HdfConfigSampleRoot* HdfGetSampleModuleConfigRoot
(void)
{
    return &g_hdfConfigSampleModuleRoot;
}
```

The content file in the C language configuration file in the foregoing example includes a configuration variable definition (or referred to as a structure definition) and an interface function. For example, the configuration variable definition includes the variable "g_hdfConfigSampleModuleRoot" in the foregoing example. This variable stores configuration information, and a structure of the variable is the same as that in the configuration source file. The interface function may be the function "HdfGetSampleModuleConfigRoot" in the foregoing example, and is used to obtain an address of a configuration data structure, where the address may be an address of a configuration structure (namely, the configuration content) in the content file.

Further, in the content file of the C language configuration file in the foregoing example, the variable "g_hdfConfigSampleModuleRoot" defines a value of the argument module and values of arguments of the device 0 and the device 1. The values separately correspond to corresponding attribute values in the configuration source file and the abstract syntax tree in the foregoing example. For example, for the device 0, the device name "deviceName" being foo, the register offset "regOffset" being 0x1, and the register base address "regBase" being 0xff00 are defined in the content file.

3. Related Descriptions of the Configuration Parser 101 in the Electronic Device 100*a*:

The configuration parser 101 is configured to read data in the binary configuration file and parse data content based on a bytecode format, to reconstruct a configuration tree having a structure consistent with that of the configuration source file (namely, the configuration source code). In addition, the configuration parser 101 further provides a series of interfaces for the driver implementation code to query, traverse, and read configuration content from the binary configuration file. It may be understood that the bytecode rule shown in the Table is preset in the electronic device 100*a*.

It may be understood that the electronic device 100*a* further includes driver implementation code (or referred to as a driver implementation). Further, in the configuration usage phase, the electronic device 100*a* may obtain the binary configuration file output by the management device 200 by using the binary configuration generator 2015 in the configuration compiler 201. Then, the electronic device 100*a* may invoke the configuration parser 101 by using the driver implementation to load the binary configuration file, to configure and drive related hardware in the electronic device 100*a*, for example, a front-facing camera and a rear-facing camera in the electronic device 100*a*.

4. Related Descriptions of the Electronic Device 100*b*:

The electronic device 100*a* includes driver implementation code (referred to as a driver implementation). Further, in the configuration usage phase, the electronic device 100*b* may obtain the C language configuration file output by the management device 200 by using the text configuration generator 2014 in the configuration compiler 201. Then, the electronic device 100*a* may directly invoke the C language configuration file by using the driver implementation, to configure and drive related hardware in the electronic device 100*a*, for example, a front-facing camera and a rear-facing camera in the electronic device 100*a*.

In addition, in some embodiments, in an example, for the electronic device 100*a*, the binary configuration file is used to configure and drive the front-facing camera in the electronic device 100*a* to start and enable a conventional photographing function and a beauty photographing function of the front-facing camera, and configure and drive the rear-facing camera to start and enable a conventional photographing function and a panoramic photographing function of the rear-facing camera, and the like. For the electronic device 100*b*, the C language configuration file is used to configure and drive a conventional photographing function of the front-facing camera, and configure and drive a conventional photographing function of the rear-facing camera.

In another example, for the electronic device 100*a*, the binary configuration file is used to configure and drive a screen-on/off function, a tap touch function, a specific gesture touch function, and a fingerprint touch function of a touchscreen in the electronic device 100*a*. For the electronic device 100*b*, the C language configuration file is used to configure and drive a screen-on/off function and a tap touch function of a touchscreen in the electronic device 100*b*.

In some embodiments, when the configuration compiler 201 performs compilation, the management device 200 invokes a compiler program by using a command line, and transfers, to the compiler by using arguments, compilation options such as an input file path, an output file path, and a compilation argument that controls output of the binary configuration file and the C language configuration. The input file path represents a path of the configuration source file, and the output file path represents an output path of a generated product of the configuration compiler 201. For example, an output path of the binary configuration file is a path from the configuration compiler 201 to the electronic device 100*a*, and an output path of the C language configuration file is a path from the configuration compiler 201 to the electronic device 100*b*. The configuration compiler 201 opens the configuration source file from a file system or a file image based on the input file path, and transfers the configuration source file to the lexical analyzer 2011 to start a compilation process. The configuration source code in the configuration source file is converted into the abstract syntax tree after being processed by the lexical analyzer 2011 and the syntax analyzer 2012. After intermediate processing, the intermediate processor 2013 determines, by using the compilation argument, a generator to be invoked, for example, the binary configuration generator 2015 or the text configuration generator 2014. For example, the compilation argument being "-t" indicates that the configuration compiler 201 outputs the C language configuration file by using the text configuration generator 2014, and the compilation argument being "-b" indicates that the configuration compiler 201 outputs the binary configuration file by using the binary configuration generator 2015. If no compilation argument is specified by using a command, the configuration compiler 201 selects the binary configuration generator 2015 by default for output.

FIG. 4A is a configuration management interface of the compilation software a in which the configuration compiler 201 is located. The interface includes a function area 41, a function area 42, a code display area 43, a compilation result display area 44, and a list area 45.

Figure 4B:
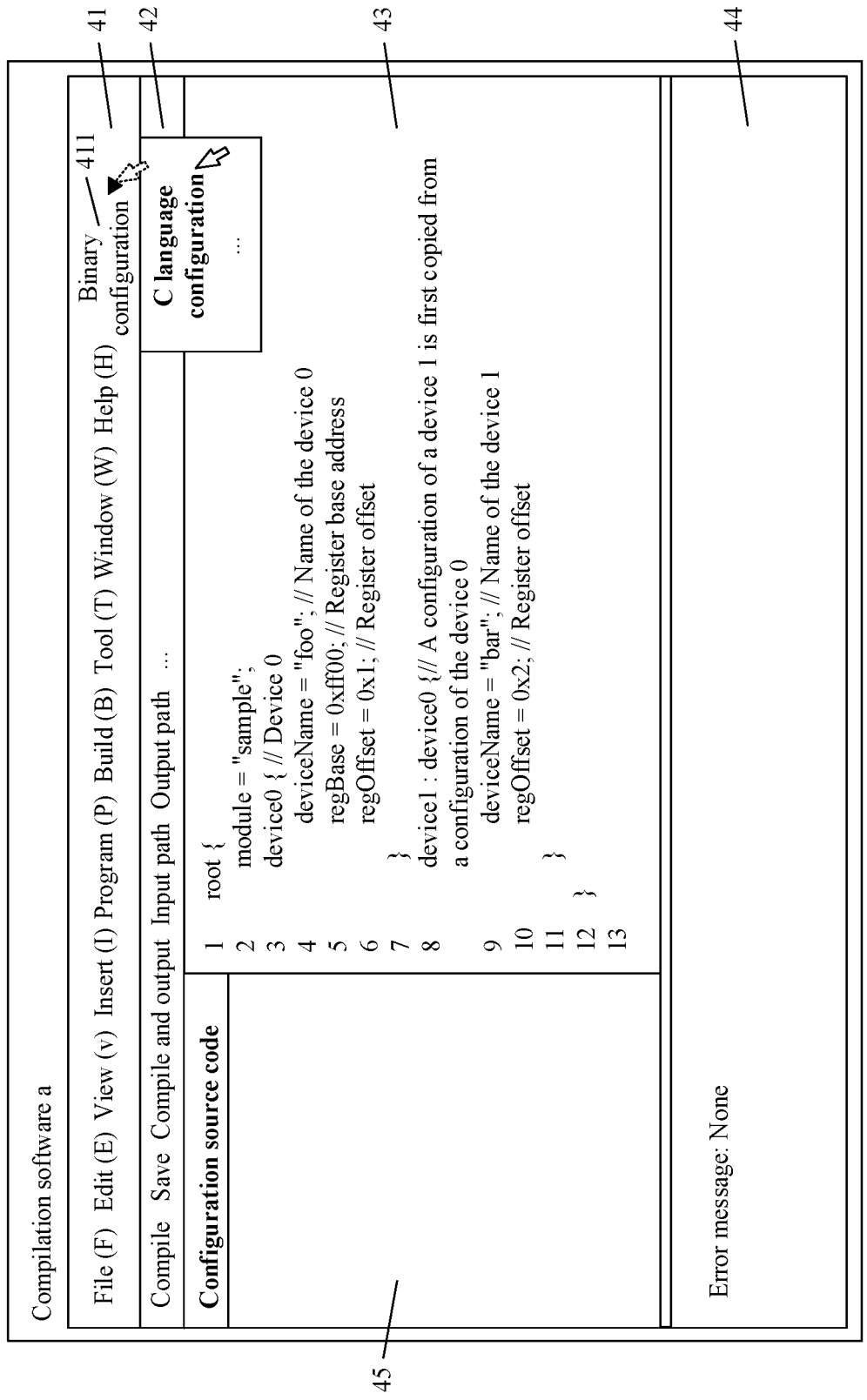
FIG. 4B is a schematic diagram of a driver configuration interface according to some embodiments of this application.

The function area 41 includes an "edit (E)" option and a compilation argument option 411, and the "edit (E)" option is used to support the user in editing code in the code display area 43, for example, configuration source code shown in the code display area 43 in FIG. 4A. The compilation argument option 411 is used to select a format of a configuration file generated by the configuration compiler 201, for example, a binary configuration and a C language configuration, but is not limited thereto. It may be understood that, if the compilation argument option 411 selects the "binary configuration" shown in FIG. 4A, it indicates that the compilation argument is "-b", and indicates that the binary configuration generator 2015 is selected to generate a binary configuration file in a compilation process of the configuration compiler 201. In addition, as shown in FIG. 4B, the user may operate the compilation argument option 411, to pop up an option "C language configuration", and operate the option "C language configuration", to control the compilation argument option 411 to select the "C language configuration" shown in FIG. 4C. This indicates that the compilation argument is "-t", and indicates that the text configuration generator 2014 is selected to generate a C language configuration file in the compilation process of the configuration compiler 201. In some embodiments, the "binary configuration" is selected by default for the compilation argument option 411 in the configuration compiler 201, that is, the binary configuration generator 2015 is used for output by default. In this case, the user may not operate the compilation argument option 411.

The function area 42 includes an option "compile", an option "compile and output", an option "input file path", an option "output file path", and the like. The option "compile" is used to trigger the configuration compiler 201 to compile the configuration source code to obtain a configuration file in a specified format. The option "compile and output" is used to trigger the configuration compiler 201 to compile the configuration source code to obtain a configuration file in a specified format, and output the generated configuration file to an electronic device such as the electronic device 100a or the electronic device 100b. The option "input path" is used to support the user in setting a path of the configuration source file. The option "output file path" is used to support the user in setting a path of an output file of the configuration compiler 201. In some other embodiments, the option "input file path" and the option "output file path" are not included in the function area 42, but are set by using some sub-options in an option "file (F)" in the function area 41.

The code display area 43 is used to display the configuration source code, the abstract syntax tree, and the binary configuration file or the C language configuration file that is subsequently compiled.

The compilation result display area 44 is used to display whether an error occurs in a compilation process of the configuration source code, the abstract syntax tree, and the binary configuration file or the C language configuration file that is subsequently compiled, a location at which the error occurs, and the error that occurs, and display a compilation result indicating whether compilation is successful.

The list area 45 is used to display the configuration source code and the abstract syntax tree that are generated in the compilation process of the configuration compiler 201, and a list of files such as the binary configuration file or the C language configuration file that is subsequently compiled. In some embodiments, after the configuration compiler 201 opens the configuration source file, as shown in FIG. 4A, the configuration source code may be displayed in the code display area 43, and a list item "configuration source code" is displayed in the list area 45. In addition, as the compilation process of the configuration compiler 201 proceeds, the configuration compiler 201 may generate the abstract syntax tree and code in the final configuration file. In addition, the configuration compiler 201 may update displayed content in the list area 45 to include at least one of the following: a list item "syntax abstraction tree 1" corresponding to an abstract syntax tree generated by the syntactic processor 2012 shown in FIG. 4E; a list item "syntax abstraction tree 2" corresponding to an abstract syntax tree generated by the intermediate processor 2013 shown in FIG. 4F; and binary configuration file code generated by the binary configuration generator 2015 shown in FIG. 4G, or a header file in C language configuration file code generated by the text configuration generator 2014 shown in FIG. 4H, and a content file in the C language configuration file code generated by the text configuration generator 2014 shown in FIG. 4I.

In some embodiments, each list item in the list area 45 may be operated by the user, and the code display area 43 is triggered to display corresponding code. In addition, when a list item in the list area 45 is selected, the configuration compiler 201 displays the list item in a special format (a bold display format shown in FIG. 4E).

It may be understood that in this embodiment of this application, for options or content on the configuration management interface of the compilation software a displayed by the management device 200, the user may perform an operation by using a mouse or the touchscreen. For example, the operation includes but is not limited to a tap operation. For example, in FIG. 4A to FIG. 4I, only a cursor "arrow" of the mouse is used as an example to describe an operation performed by the user on each option or content.

In some embodiments of this application, when the "binary configuration" is selected for the compilation argument option 411, and the option "compile" and the option "compile and output" are operated by the user, the configuration compiler 201 may sequentially display content shown in FIG. 4D to FIG. 4G. It may be understood that, when the "C language configuration" is selected by default for the compilation argument option 411, and the option "compile" and the option "compile and output" are operated by the user, content sequentially displayed by the configuration compiler 201 is similar to the content shown in FIG. 4D to FIG. 4G, and details are not described herein again.

In addition, in some embodiments, an example in which an error occurs in a line of code in the configuration source code of the configuration source file is used to describe a location and content of the error prompted by the syntax analyzer 2012. In an example, with reference to the configuration source code shown in the foregoing example, it is assumed that the code "module="sample";" in the configuration source file is replaced with "module="sample";;". As shown in FIG. 4D, the management device 200 inputs the configuration source code into the syntax analyzer 2012, and the syntax analyzer 2012 outputs that an error occurs in this line of code and the error is that a mark ";" repeats. Further, the code "module="sample";;" on the interface shown in FIG. 4D is displayed in a special format (for example, an underlined display format), and "error message: location: line 2, error content:;; repeat" is displayed in the compilation result display area. Then, the user may correct the content in the configuration source file, and corrected configuration source code is displayed on the configuration management interface shown in FIG. 4A.

Specific Implementations of the Driver Configuration Management Method:

According to some embodiments of this application, the specific implementations of the driver configuration management method are described based on the components in the management device 200, the electronic device 100a, and the electronic device 100b in the foregoing example.

Figure 5:
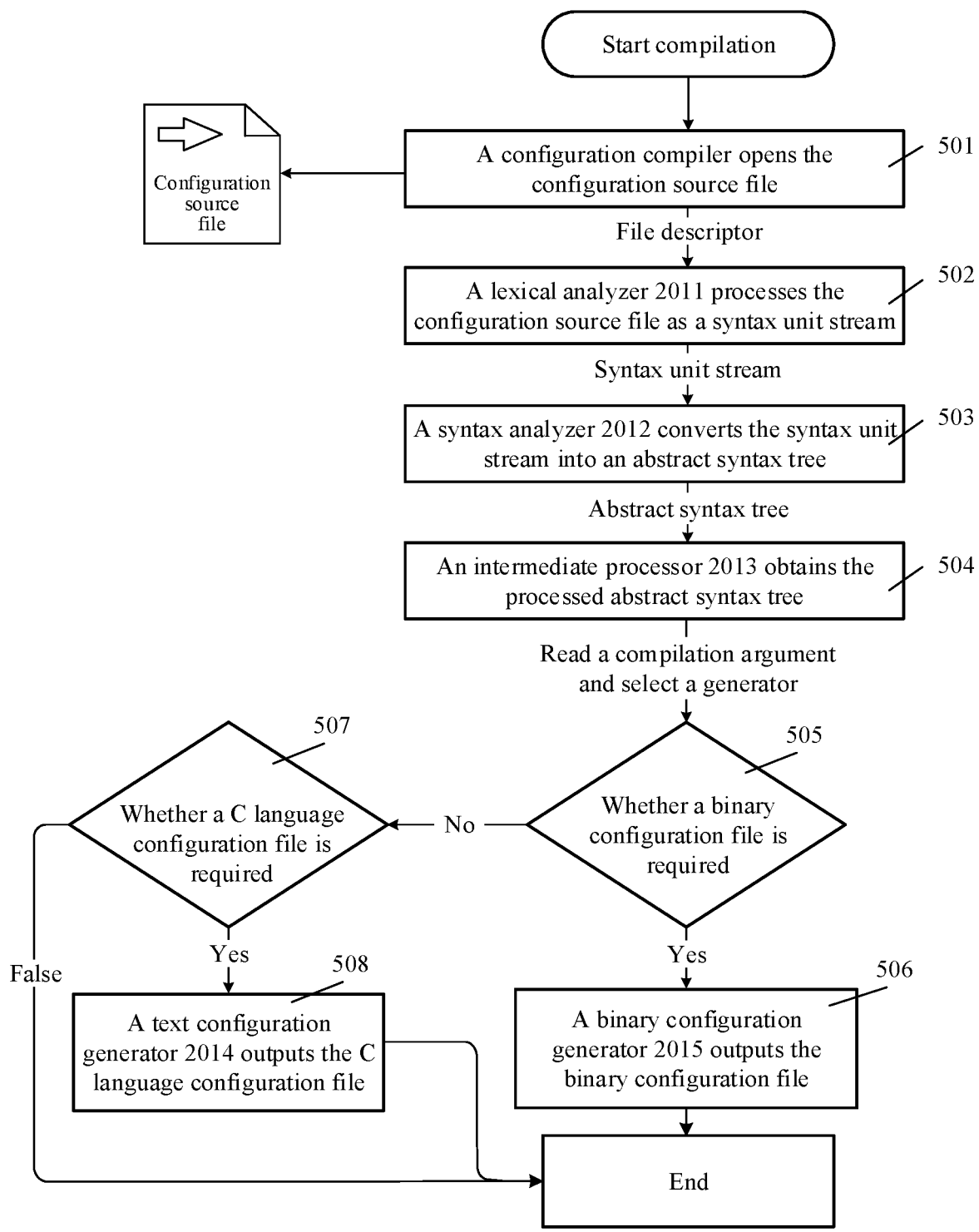
FIG. 5 is a schematic diagram of a driver configuration management method according to some embodiments of this application.

In a specific embodiment, based on the driver configuration management system 10 shown in FIG. 3, FIG. 5 is a schematic flowchart of a driver configuration management method according to an embodiment of this application. Although a logical sequence of the driver configuration management method provided in this embodiment of this application is shown in the method flowchart, in some cases, the shown or described steps may be performed in a sequence different from the sequence herein. For example, the driver configuration management method shown in FIG. 5 is applied to the configuration compilation phase, and includes steps 501 to 506.

Step 501: Configuration compilation is started, and the management device 200 opens configuration source code in a configuration source file by using the configuration compiler 201, to obtain file descriptors of the configuration source file, and inputs the file descriptors to the lexical analyzer 2011.

It may be understood that the management device 200 inputs the configuration source code in the configuration source file to the configuration compiler 201. In addition, the file descriptors of the configuration source code may be strings in the configuration source code. In this case, the management device 200 may display the configuration management interface including the configuration source code shown in FIG. 4A.

Step 502: The management device 200 processes the configuration source file into a syntax unit stream (namely, a syntax unit sequence or a token stream) by using the lexical analyzer 2012, and outputs the syntax unit stream to the syntax analyzer 2012.

Step 503: The management device 200 performs a syntax check on the syntax unit stream by using the syntax analyzer 2012 of the configuration compiler 201, converts a syntax unit in the syntax unit stream into an abstract syntax tree, and outputs the abstract syntax tree to the intermediate processor 2013.

In some embodiments, in step 503, when performing the syntax check on the syntax unit stream, the management device 200 may learn whether an error exists in the syntax unit stream. If an error exists in the syntax unit stream, the management device 200 may control the configuration compiler 201 to prompt the user with a location and content of the error through the configuration management interface. Then, the user may manually correct the error as prompted. If no error exists in the syntax unit stream, or the user corrects the error, the management device 200 may control the configuration compiler 201 to convert the syntax unit stream into an abstract syntax tree, and output the abstract syntax tree to the intermediate processor 2013. It may be understood that, that an error exists in the syntax unit stream may indicate that an error exists in the configuration source code. For example, for an example of the location and content of the error prompted by the management device 200, refer to the content shown in FIG. 4B. Further, for corrected configuration source code, refer to the content shown in FIG. 4A. In addition, for the syntax abstraction tree generated by the management device 200 by using the syntax processor 2012, refer to the content shown in FIG. 4E.

Step 504: The management device 200 processes, by using the intermediate processor 2013, the abstract syntax tree output by the syntax analyzer 2012 to obtain a processed abstract syntax tree, reads a compilation argument, and selects a generator, that is, selects the binary configuration generator 2015 or the text configuration generator 2014.

Processing performed by the intermediate processor 2013 on the abstract syntax tree includes but is not limited to the redefinition check, reference expansion, and the like in the foregoing examples. It may be understood that, the intermediate processor 2013 processes the obtained abstract syntax tree, and modifies a redefinition error, or implements reference expansion of a statement. For example, for the syntax abstraction tree generated by the management device 200 by using the syntax processor 2012, refer to the content shown in FIG. 4F.

It may be understood that the management device 200 reads, by using the configuration compiler 201, whether the compilation argument is "-b" or "-t". Further, as shown in FIG. 4A and FIG. 4C, the management device 200 may determine whether the compilation argument option 411 in the configuration compiler 201 is selected as a "binary configuration" or a "C language configuration", so as to select a corresponding generator.

Step 505: The management device 200 determines whether a binary configuration file needs to be output.

If it is determined that the binary configuration file needs to be output, that is, the compilation argument is selected as the "binary configuration" (namely, "-b"), the following step 506 is performed, and a compilation process ends. If it is determined that the binary configuration file does not need to be output, the following step 507 is performed. In addition, if an error occurs in the determining process in step 505 and step 507, the compilation process ends.

Step 506: The management device 200 outputs, by using the binary configuration generator 2015, the abstract syntax tree generated by the intermediate processor 2013 as a binary configuration file. In this case, the configuration compiler 201 is in a binary configuration generation mode, and the management device 200 may display the content shown in FIG. 4G. In addition, the management device 200 may output the generated binary configuration file to the electronic device 100a (namely, the fullweight device).

Step 507: The management device 200 determines whether to output a C language configuration file.

If it is determined that the C language configuration file needs to be output, that is, the compilation argument is selected as the "C language configuration" (namely, "-t"), the following step 508 is performed. If an error occurs in the determining process, the compilation process ends.

Step 508: The management device 200 outputs, by using the text configuration generator 2014, the abstract syntax tree generated by the intermediate processor 2013 as a C language configuration file. In this case, the configuration compiler 201 is in a C language configuration generation mode. In addition, the management device 200 may display the content shown in FIG. 4H and FIG. 4I. In addition, the management device 200 may output the generated binary configuration file to the electronic device 100b (namely, the lightweight device).

Figure 6:
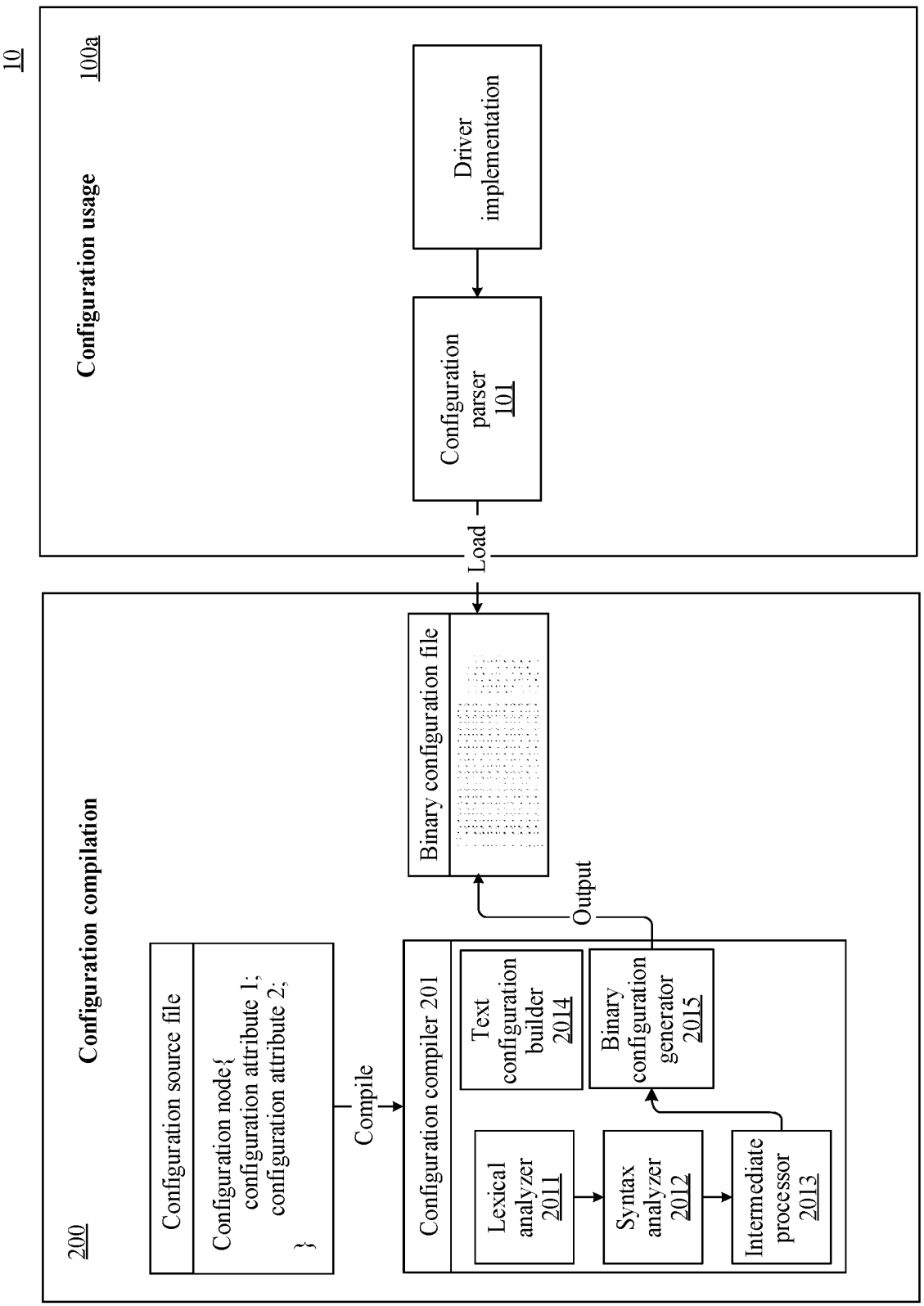
FIG. 6 is a schematic diagram of a structure of a driver configuration management system according to some embodiments of this application.

Specific Implementations of the Driver Configuration Management Method in the Binary Configuration Generation Mode:

According to some embodiments of this application, with reference to the driver configuration management system 10 shown in FIG. 3, FIG. 6 is a schematic diagram of an application process of the driver configuration management system 10 in a fullweight environment. FIG. 6 briefly shows configuration nodes included in configuration source code and each configuration attribute thereof. For details, refer to the configuration source code shown in FIG. 4A. Further, the management device 200 sequentially uses the lexical analyzer 2011, the syntax analyzer 2012, and the intermediate processor 2013 to generate an abstract syntax tree, and outputs a binary configuration file to the electronic device 100*a* by using the binary configuration generator 2015. Then, the electronic device 100*a* uses a driver implementation to invoke the configuration parser 101 to load the binary configuration file.

Figure 7:
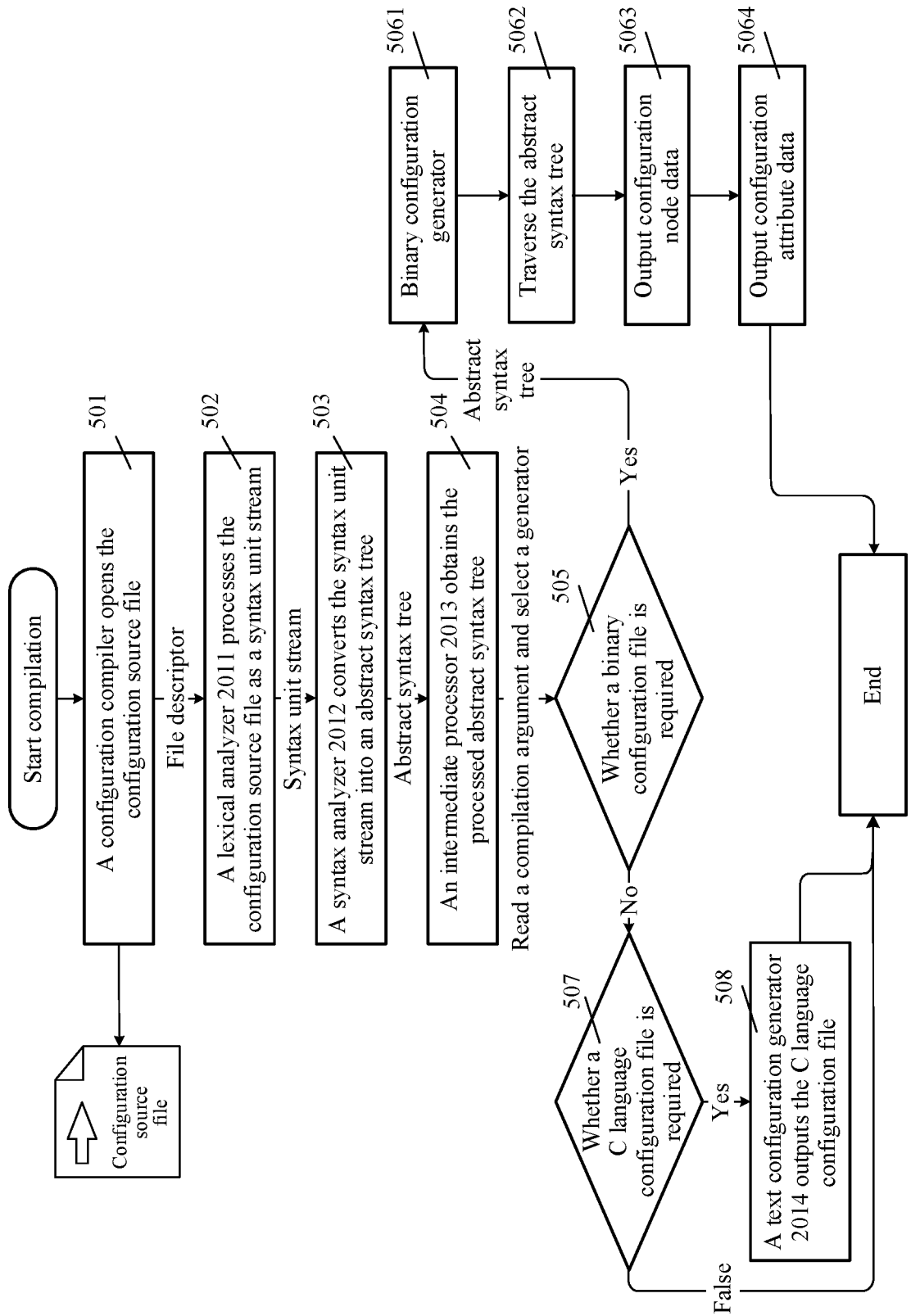
FIG. 7 is a schematic diagram of a driver configuration management method according to some embodiments of this application.

Further, based on the application process of the driver configuration management system 10 shown in FIG. 6, with reference to the method shown in FIG. 5, in a scenario in which the configuration compiler selects the compilation argument "-b" in the configuration compilation phase, that is, the binary configuration generator 2015 is selected to generate the binary configuration file, as shown in FIG. 7, the driver configuration management method provided in this embodiment of this application includes the following steps.

Step 501 to step 505 are the same as the steps described with reference to FIG. 5 in the foregoing embodiment, and are not described herein again.

In the method shown in FIG. 7, when it is determined in step 505 that the binary configuration file needs to be output, that is, the compilation argument is "-b", step 506 shown in FIG. 5 is replaced by steps 5061 to 5064 as executed steps.

Step 5061: The management device 200 outputs the abstract syntax tree generated by the intermediate processor 2013 to the binary configuration generator 2015.

Step 5062: The management device 200 traverses the abstract syntax tree by using the binary configuration generator 2015.

It may be understood that, in some embodiments, the abstract syntax tree is a tree structure constructed by using a sibling and child representation method, and a manner in which the binary configuration generator 2015 traverses the abstract syntax tree includes but is not limited to depth traversal and reverse depth traversal. The depth traversal is to traverse each subtree (including the subtree itself) in a sequence of first a child node and then a sibling node of the child node. For example, for the abstract syntax tree output by the intermediate processor 2013 in the foregoing example, a traversal sequence is root, module, sample, device0, deviceName, foo, and so on. In addition, the reverse depth traversal of the tree is to traverse each subtree (including the subtree itself) in a sequence of first a sibling node of a child node and then the child node. For example, for the abstract syntax tree output by the intermediate processor 2013 in the foregoing example, a traversal sequence is sample, module, foo, deviceName, device0, . . . , root.

The foregoing are merely examples for description, and this application is not limited thereto. Traversal in another manner also falls within the protection scope intended for this application.

Step 5063: The management device 200 outputs configuration node data by using the binary configuration generator 2015.

Step 5064: The management device 200 outputs configuration attribute data by using the binary configuration generator 2015.

It may be understood that the binary configuration generator 2015 traverses the abstract syntax tree transferred by the intermediate processor 2013, and outputs the configuration content as the binary configuration file based on the bytecode coding table described above, where the binary configuration file includes the configuration node data and the configuration attribute data. In addition, for the configuration node data and the configuration attribute data, refer to the content shown in FIG. 4G and the content in the foregoing example, and details are not described herein again.

Further, when the binary configuration file is output, topology information in the configuration source file is retained, that is, a relationship between nodes is stored, for example, a parent-child relationship or a sibling relationship between nodes. The relationship is used to describe a relationship between configurations during configuration usage.

In other words, when this application is applied in the fullweight environment, the configuration source code is output, by using the configuration compiler, as a binary configuration file in a bytecode format. A bytecode reserves a configured topology structure to a maximum extent, so that various traversal operations can be conveniently performed during parsing. Compared with a generated C language configuration file, the bytecode has slightly higher RAM and ROM overheads (namely, processing time, power consumption, occupied storage space, and the like) of the electronic device, and is more applicable to an environment that does not have an ultimate requirement on performance.

In addition, the method shown in FIG. 7 further includes step 507 and step 508, which are the same as the steps described with reference to FIG. 5 in the foregoing embodiment, and details are not described herein again.

Figure 8:
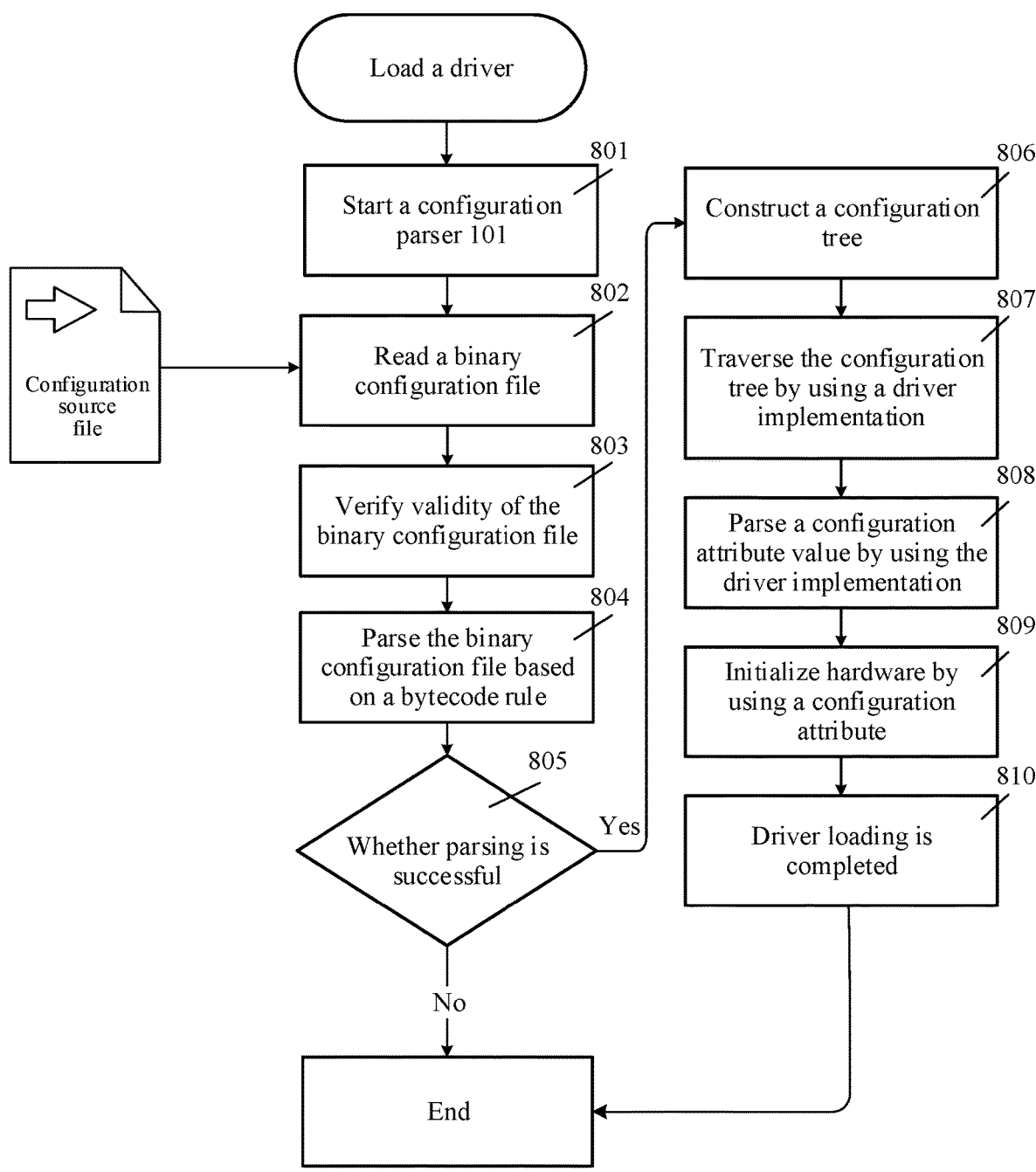
FIG. 8 is a schematic diagram of a driver configuration management method according to some embodiments of this application.

Correspondingly, in the fullweight environment shown in FIG. 6, with reference to the method in FIG. 7, in the configuration usage phase, as shown in FIG. 8, the driver configuration management method provided in this embodiment of this application further includes the following steps.

Step 801: When a driver is loaded, the electronic device 100*a* starts the configuration parser 101.

Step 802: The electronic device 100*a* reads, by using the configuration parser 101, the binary configuration file corresponding to the configuration source code.

It may be understood that after the configuration compiler 201 generates the binary configuration file, the electronic device 100*a* may add the binary configuration file to a system image of the electronic device 100*a* by using a file system or in a manner of directly packaging the binary configuration file into the image. When the driver implementation code needs to use a configuration, the binary configuration file is first loaded by using the configuration parser 101, that is, a binary storage format is converted into a configuration tree in the memory (for details, refer to the following steps 803 to 806), to facilitate query and traversal. The configuration parser 101 provides a traversal and reading interface for the driver to use, and the driver implementation code of the electronic device 100*a* obtains configuration content through a configuration parsing interface based on a requirement of the driver implementation code.

Step 803: The electronic device 100a checks validity of the binary configuration file by using the configuration parser 101.

For example, the electronic device 100a may check a suffix of the binary configuration file, or check whether a magic number in the binary configuration file is a predefined value (for example, "0A A0 0A A0" in the foregoing example), to check the validity of the binary configuration file. If the suffix is a predefined suffix, or the magic number is the predefined value, the binary configuration file is valid. Otherwise, the binary configuration file is invalid.

When it is detected that the binary configuration file is valid, the following step 804 continues to be performed. Otherwise, the configuration usage process ends.

Step 804: The electronic device 100a parses the binary configuration file based on the bytecode rule by using the configuration parser 101. Further, for a process of parsing the binary configuration file based on the bytecode, refer to the descriptions in the example related to the Table. Details are not described herein again.

Step 805: The electronic device 100a determines, by using the configuration parser 101, whether the binary configuration file is successfully parsed.

If parsing is successful, the following step 806 is performed. Otherwise, the configuration usage process ends. It may be understood that successful parsing indicates that characters in the binary configuration file meet the bytecode rule, and all the characters are parsed.

Step 806: The electronic device 100a constructs a configuration tree of the binary configuration file by using the configuration parser 101.

Step 807: The electronic device 100a traverses the configuration tree by using the driver implementation code.

Further, the electronic device 100a may first determine hardware that needs to obtain information in the configuration tree, and then traverse the configuration tree for the required hardware. For example, if the electronic device 100a needs to obtain information about the device 0 (for example, the front-facing camera), the electronic device 100a may traverse the configuration tree to find a determined node "device 0" for the device 0.

Step 808: The electronic device 100a parses a required configuration attribute value by using the driver implementation code.

For example, for the device 0, the electronic device 100a may traverse and find, in the configuration tree, an attribute and an attribute value that corresponds to the node "device 0".

Step 809: The electronic device 100a initializes the hardware by using the driver implementation code and the configuration attribute.

For example, after obtaining information such as the attribute and the attribute value of the device 0, the electronic device 100a may perform a hardware initialization operation on the device 0.

Step 810: Hardware driver loading of the electronic device 100a is completed. For example, the electronic device 100a completes driving of the front-facing camera and the rear-facing camera.

Figure 9:
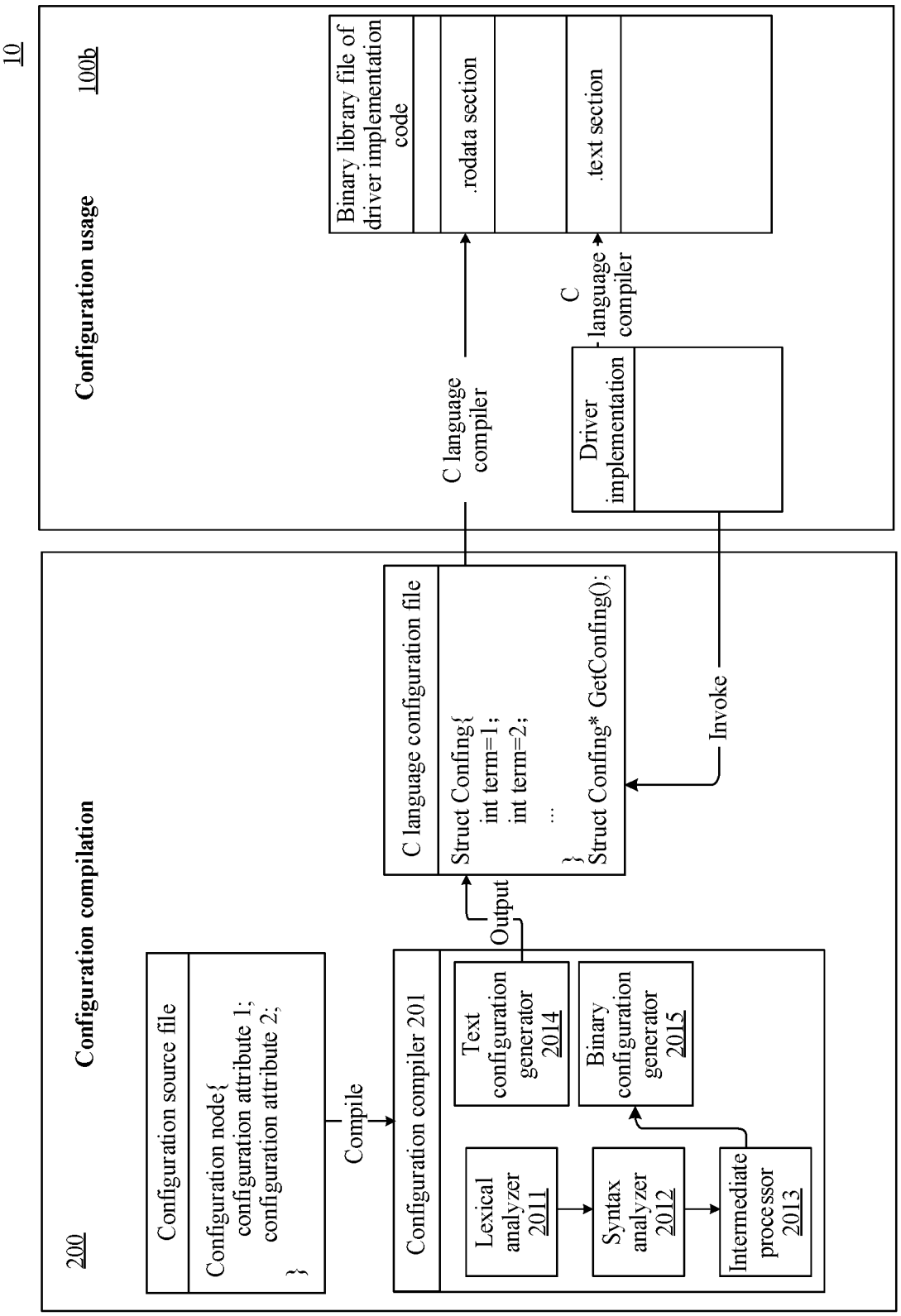
FIG. 9 is a schematic diagram of a structure of a driver configuration management system according to some embodiments of this application.

C Language Configuration Generation Mode:

According to some embodiments of this application, with reference to the driver configuration management system 10 shown in FIG. 3, FIG. 9 is a schematic diagram of an application process of the driver configuration management system 10 in a lightweight environment. FIG. 9 briefly shows configuration nodes included in configuration source code and each configuration attribute thereof. For details, refer to the configuration source code shown in FIG. 4A. Further, the management device 200 sequentially uses the lexical analyzer 2011, the syntax analyzer 2012, and the intermediate processor 2013 to generate an abstract syntax tree, and outputs a C language configuration file to the electronic device 100b by using the text configuration generator 2014. Then, the electronic device 100b invokes the C language configuration file by using the driver implementation code.

Figure 10:
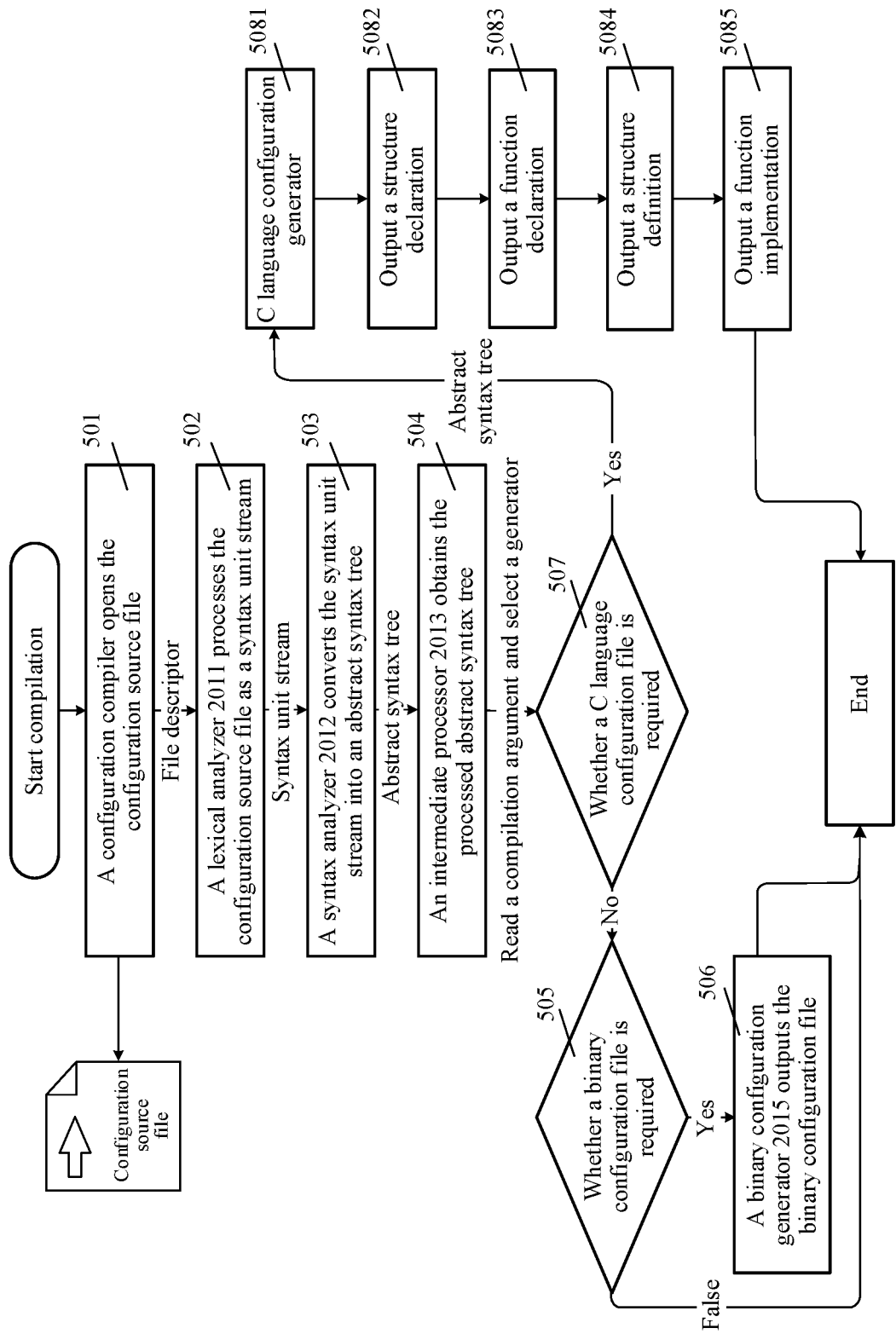
FIG. 10 is a schematic diagram of a driver configuration management method according to some embodiments of this application.

Further, based on the application process of the driver configuration management system 10 shown in FIG. 9, with reference to the method shown in FIG. 5, in a scenario in which the configuration compiler selects the compilation argument "-t" in the configuration compilation phase, that is, the text configuration generator 2014 is selected to generate the C language configuration file, as shown in FIG. 10, the driver configuration management method provided in this embodiment of this application includes the following steps.

Step 501 to step 505 are the same as descriptions of the steps described with reference to FIG. 5 in the foregoing embodiment, and are not described herein again.

When it is determined in step 505 that the C language configuration file needs to be output, that is, the compilation argument is "-t", step 508 shown in FIG. 5 is replaced by steps 5081 to 5084 shown in FIG. 10 as executed steps. In addition, in FIG. 5, step 505 is performed before step 507, but a difference in the method shown in FIG. 10 is that step 507 is performed before step 505. In this case, the determining process is as follows: The management device 200 first determines whether the C language configuration file needs to be output, and then determines whether to output a binary configuration file.

Step 5081: The management device 200 outputs the abstract syntax tree generated by the intermediate processor 2013 to the C language configuration generator 2014.

It may be understood that, when this application is applied in the lightweight environment, after the configuration source code is output by the configuration compiler 201 as C language configuration file code, the C language configuration file code participates in driver code compilation. In addition, configuration-part code corresponding to the C language configuration file is compiled by a C language compiler into a read-only data segment (for example, a data segment ".rodata section" shown in FIG. 9) of the electronic device 100b, and content of the data segment can only be read and cannot be modified, to ensure security of configuration data in the C language configuration file. In addition, after the driver implementation code is compiled, function code (namely, code other than the configuration code) is stored in another data segment (for example, a data segment ".text section" shown in FIG. 9) of the electronic device 100b, and the data segment may be a readable and writable data segment. In this way, the driver implementation code may directly access a data address of a corresponding read-only storage data segment, and obtain configuration content of the C language configuration file, thereby eliminating overheads of configuration parsing of the electronic device 100b (namely, the fullweight device), and maximizing device performance.

It may be understood that the C language compiler in this embodiment of this application is the text configuration generator 2014. In this embodiment of this application, the text configuration generator being referred to as the C language compiler is merely used to clearly describe the C language being used in a process in which the text configuration generator compiles the driver implementation code and the code in the C language configuration file. This does not constitute a limitation on essence of the text configuration generator.

Step 5082: The management device 200 outputs a configuration structure declaration by using the C language configuration generator 2014.

It may be understood that the C language configuration generator 2014 traverses the abstract syntax tree, and an output configuration structure declaration may be struct HdfConfigSampleDevice0, struct HdfConfigSampleDevice1, and struct HdfConfigSampleDRoot in the foregoing example.

Step 5083: The management device 200 outputs a function declaration by using the C language configuration generator 2014.

It may be understood that the C language configuration generator 2014 traverses the abstract syntax tree, and outputs a declaration of a configuration obtaining function, for example, the function "const struct HdfConfigSampleRoot*HdfGetSampleModuleConfigRoot (void)" in the example, to a configuration header file.

Step 5084: The management device 200 outputs a structure definition, namely, a configuration structure definition, by using the C language configuration generator 2014.

It may be understood that the C language configuration generator 2014 traverses the abstract syntax tree, and outputs a configuration variable definition (namely, the structure definition), for example, the variable "g_hdfConfigSampleModuleRoot" in the example. The variable stores configuration information, and a structure of the variable is consistent with a structure in the configuration source file.

Step 5085: The management device 200 outputs a function implementation, namely, a configuration interface function implementation, by using the C language configuration generator 2014.

It may be understood that the C language configuration generator 2014 traverses the abstract syntax tree, and outputs a function implementation, for example, the function "HdfTetSampleModuleConfigRoot" in the foregoing example, to obtain an address of a configuration data structure, and output the address to a content file of the C language configuration file.

Figure 11:
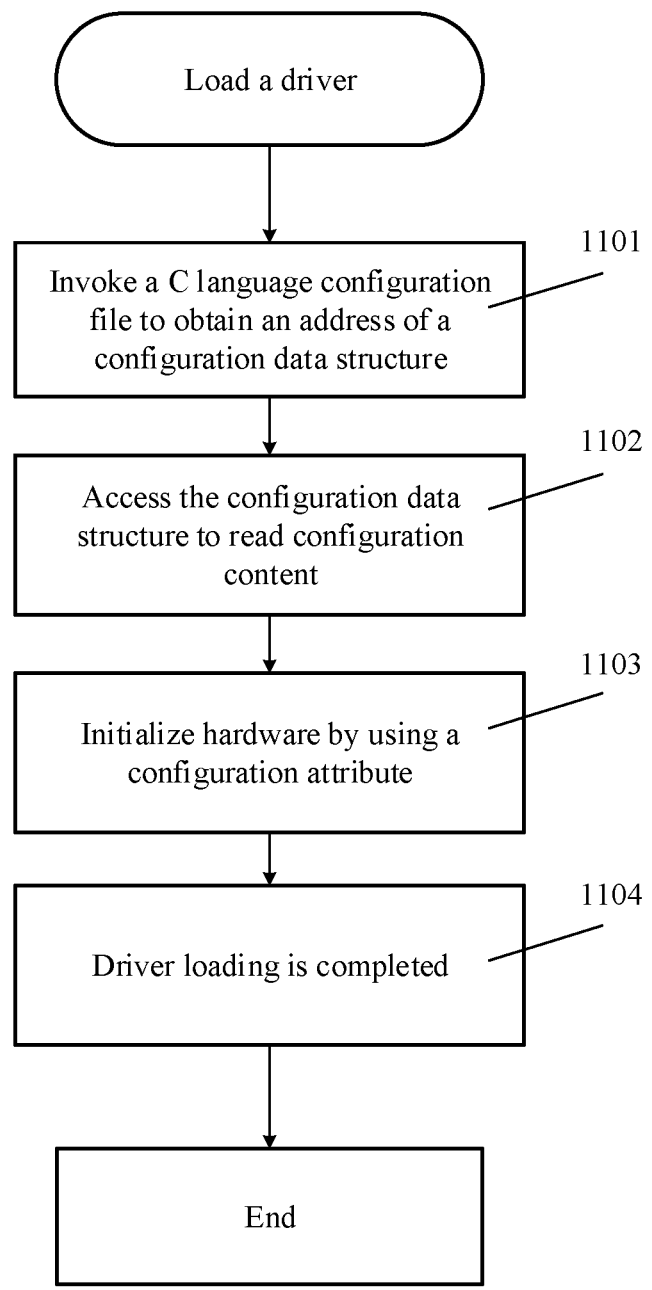
FIG. 11 is a schematic diagram of a driver configuration management method according to some embodiments of this application.

Correspondingly, in the lightweight environment shown in FIG. 9, with reference to the method in FIG. 10, in the configuration usage phase, as shown in FIG. 11, the driver configuration management method provided in this embodiment of this application further includes the following steps.

Step 1101: When a driver is loaded, the electronic device 100b invokes the C language configuration file by using the driver implementation code to obtain the address of the configuration data structure (namely, a configuration structure), for example, an address of the read-only data segment ".rodata section".

Further, the electronic device 100b invokes a header file in the C language configuration file, accesses an interface function (for example, the function "HdfTetSampleModuleConfigRoot" in the foregoing example) in the content file by using an interface function declaration in the header file, and obtains a configuration data address by using the interface function. The address is the address of the read-only data segment ".rodata section".

Step 1102: The electronic device 100b accesses the configuration data structure by using the driver implementation code to read configuration content.

It may be understood that, the electronic device 100b reads code in the C language configuration file from the read-only data segment ".rodata section", that is, accesses configuration content represented by the configuration structure in the content file.

Step 1103: The electronic device 100b initializes hardware by using the driver implementation code and a configuration attribute.

It may be understood that, the electronic device 100b reads the header file and the content file from the C language configuration file, to obtain the configuration content (namely, the configuration attribute) represented by the configuration structure in the content file. For example, as described above, each attribute corresponding to the device 0 is obtained to initialize the device 0.

Step 1104: Hardware driver loading of the electronic device 100b is completed. For example, the electronic device 100a completes driving of the front-facing camera and the rear-facing camera.

In this way, the driver configuration management method provided in this application may be used on a lightweight platform and may also be used on a fullweight platform, and two usage manners are used to implement performance and flexibility that are concerned in respective scenarios. In other words, a difference that the lightweight platform focuses more on performance and the fullweight platform focuses more on flexibility is resolved. Further, a problem of coupling between code and a configuration is resolved.

Figure 12:
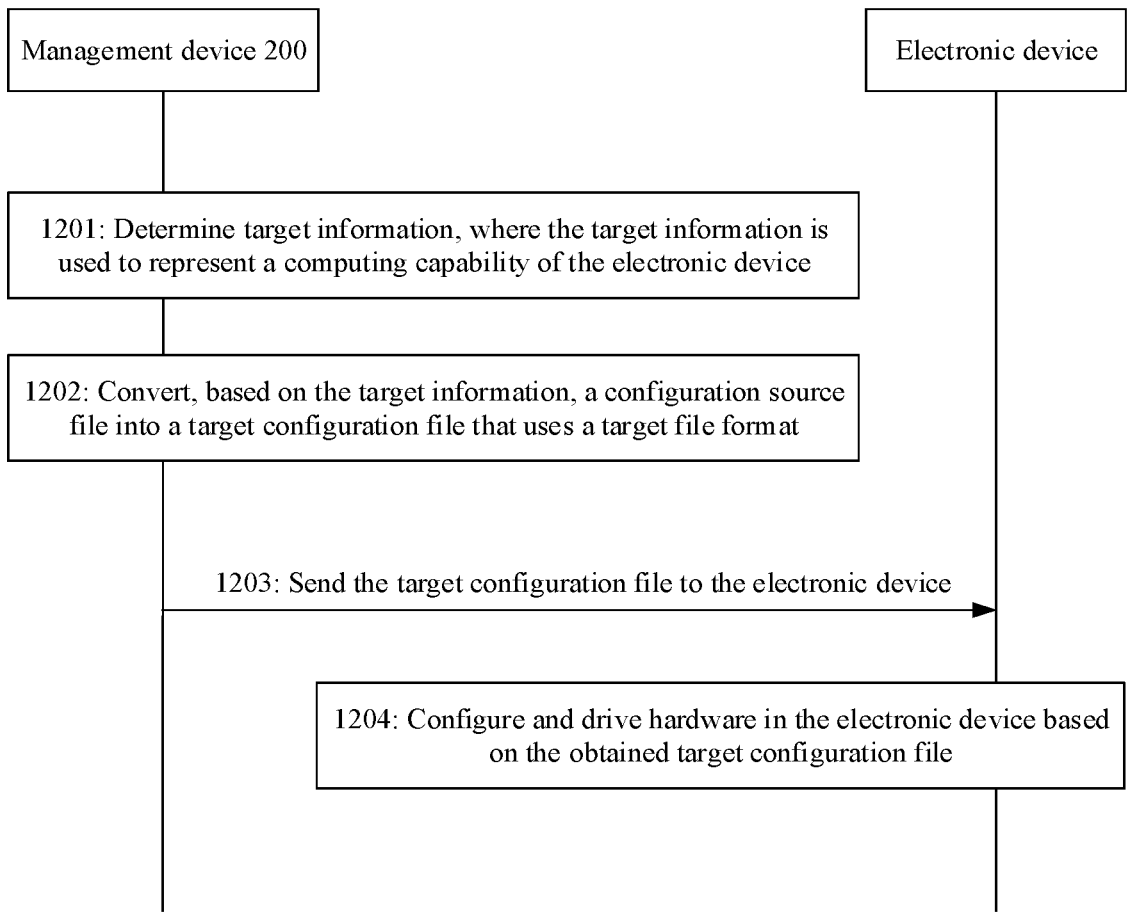
FIG. 12 is a schematic diagram of a driver configuration management method according to some embodiments of this application.

FIG. 12 shows a specific process of a driver configuration management method according to an embodiment of this application. For example, the method may include the following step 1021 to step 1204.

Step 1201: A management device 200 determines target information, where the target information is used to represent a computing capability of an electronic device (for example, an electronic device 100a or an electronic device 100b).

In an embodiment, the target information is information about the computing capability of the electronic device, or is a compilation argument indicating the following target file format.

Step 1202: The management device 200 converts, based on the target information, a configuration source file into a target configuration file that uses the target file format.

It may be understood that the configuration source file in step 1202 corresponds to the electronic device indicated by the target information. The management device 200 generates a configuration file in a C language format for the electronic device 100b (namely, a lightweight device), and generates a configuration file in a binary format for the electronic device 100a (namely, a fullweight device).

Step 1203: The management device 200 sends the target configuration file to the electronic device.

For example, the management device 200 may establish a wireless communication connection or a wired communication connection to the electronic device, to send the target file to the electronic device.

Step 1204: The electronic device configures and drives hardware in the electronic device based on the obtained target configuration file.

Further, for a manner in which the electronic device invokes the target configuration file for configuration in the step, refer to the manner in which the electronic device 100a and the electronic device 100b invoke the configuration files in the foregoing embodiments. Details are not described herein again.

In addition, for other specific implementations details of step 1021 to step 1024, refer to corresponding implementation details in the foregoing method embodiments. In this way, in a driver configuration management process, performance of the lightweight device can be ensured, and high flexibility and a complete hardware topology structure description capability of the fullweight device can also be implemented.

In embodiments of this application, an entity that performs the driver configuration management method may be referred to as a driver configuration management apparatus. Further, the driver configuration management apparatus may be divided into one or more modules. For example, each module may be obtained through division based on a corresponding function, or two or more functions may be integrated into one processing module. The integrated module may be implemented in a form of hardware, or may be implemented in a form of a software functional module. It should be noted that, in embodiments of this application, module division is an example, and is merely logical function division. In actual implementation, another division manner may be used.

It may be understood that, when the driver configuration management method provided in embodiments of this application is applied to a management device that manages one or more electronic devices that require hardware configurations, the driver configuration management apparatus may be a control module or apparatus that is in the management device and that is configured to perform the driver configuration management method.

When the driver configuration management method provided in embodiments of this application is applied to an electronic device (for example, an electronic device 100a or an electronic device 100b) that requires a hardware configuration, the driver configuration management apparatus may be a control module or apparatus that is in the electronic device and that is configured to perform the driver configuration management method.

Figure 13:
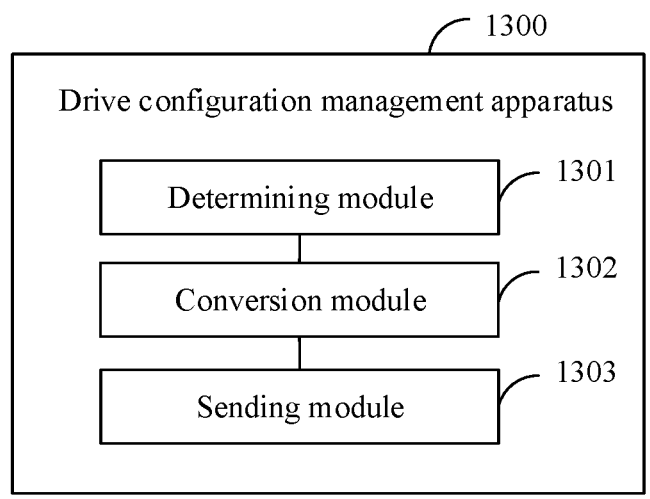
FIG. 13 is a schematic diagram of a driver configuration management apparatus according to some embodiments of this application.

FIG. 13 is a possible schematic diagram of a structure of a driver configuration management apparatus according to the foregoing embodiments. The driver configuration management apparatus is used in a management device. As shown in FIG. 13, a driver configuration management apparatus 1300 includes: a determining module 1301 configured to determine target information, where the target information is used to represent a computing capability of an electronic device; a conversion module 1302 configured to convert, based on the target information determined by the determining module 1301, a configuration source file into a target configuration file that uses a target file format; and a sending module 1303 configured to send the target configuration file obtained by the conversion module 1302 through conversion to the electronic device.

Figure 14:
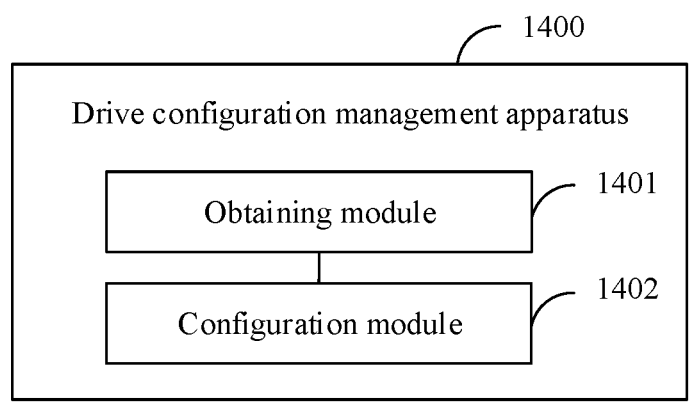
FIG. 14 is a schematic diagram of a driver configuration management apparatus according to some embodiments of this application.

FIG. 14 is a possible schematic diagram of a structure of a driver configuration management apparatus according to the foregoing embodiments. The driver configuration management apparatus is used in a management device that manages an electronic device requiring a hardware configuration. As shown in FIG. 14, a driver configuration management apparatus 1400 includes: an obtaining module 1401 configured to obtain a target configuration file that uses a target file format, where the target file format corresponds to a computing capability of the electronic device; and a configuration module 1402 configured to configure and drive hardware in the electronic device based on the target configuration file obtained by the obtaining module 1401.

It may be understood that, the driver configuration management apparatus 1300 shown in FIG. 13 corresponds to the driver configuration management method performed by the management device provided in this application, and the driver configuration management apparatus 1400 shown in FIG. 14 corresponds to the driver configuration management method performed by the electronic device provided in this application. Technical details in the specific descriptions of the method embodiments provided in this application are still applicable to the driver configuration management apparatuses shown in FIG. 13 and FIG. 14. For specific descriptions, refer to the foregoing descriptions. Details are not described herein again.

Figure 15:
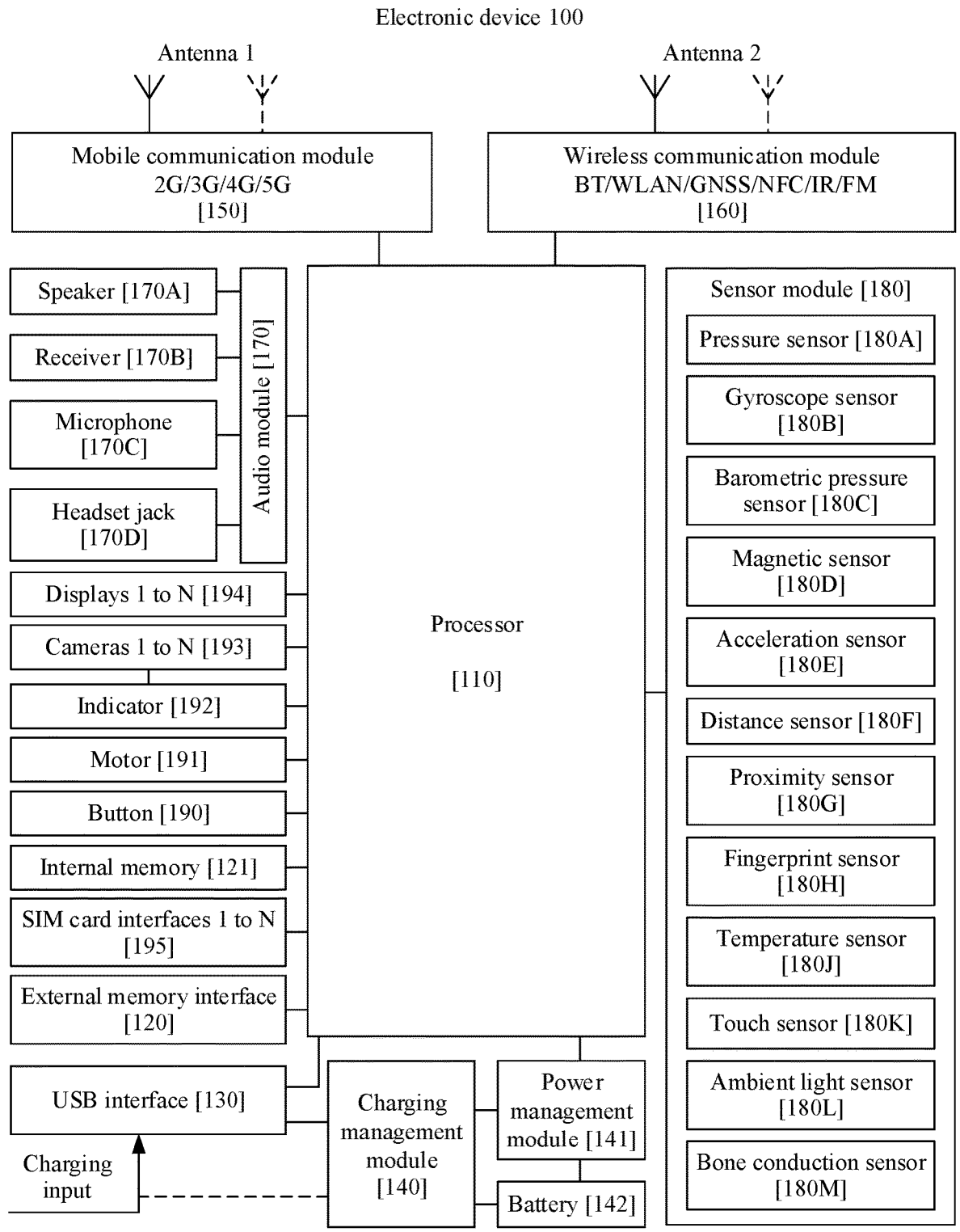
FIG. 15 is a schematic diagram of a structure of an electronic device according to some embodiments of this application.

FIG. 15 is a schematic diagram of a structure of an electronic device 100 (for example, an electronic device 100a or an electronic device 100b). The electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the electronic device 100. In some other embodiments of this application, the electronic device 100 may include more or fewer components than those shown in the figure, or some components may be combined, or some components may be split, or there may be a different component layout. The components shown in the figure may be implemented by hardware, software, or a combination of software and hardware.

The processor 110 may include one or more processing units. Different processing units may be independent components, or may be integrated into one or more processors.

A memory may further be disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor may directly invoke the instructions or the data from the memory. This avoids repeated access, reduces waiting time of the processor 110, and improves system efficiency.

It may be understood that an interface connection relationship between the modules shown in this embodiment of this application is merely an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

A wireless communication function of the electronic device 100 may be implemented through the antenna 1, the antenna 2, the mobile communication module 150, the wireless communication module 160, the modem processor, the baseband processor, and the like. For example, the electronic device 100 may establish wireless communication with a management device 200 by using the wireless communication function.

The wireless communication module 160 may provide a wireless communication solution that is applied to the electronic device 100, and that includes a wireless local area network (WLAN) (for example, a Wi-Fi network), BLUETOOTH (BT), a global navigation satellite system (GNSS), frequency modulation (FM), a near field communication (NFC) technology, an infrared (IR) technology, or the like.

The electronic device 100 implements a display function through the GPU, the display 194, the application processor, and the like. For example, the driver configuration interface in the foregoing example is displayed. The GPU is a microprocessor for image processing, and connects the display 194 to the application processor. The GPU is configured to: perform mathematical and geometric computation, and render an image. The processor 110 may include one or more GPUs that execute program instructions to generate or change display information.

The electronic device 100 may implement a photographing function through the image signal processor (ISP), the camera 193, the video codec, the GPU, the display 194, the application processor, and the like.

The external memory interface 120 may be configured to connect to an external storage card, for example, a microSD card, to extend a storage capability of the electronic device 100. The external storage card communicates with the processor 110 through the external memory interface 120, to implement a data storage function. For example, files such as music, a video, the binary configuration file or the C language configuration file are stored in the external storage card.

The internal memory 121 may be configured to store computer-executable program code, and the executable program code includes instructions. The processor 110 executes various function applications and data processing of the electronic device 100 by running the instructions stored in the internal memory 121. For example, the processor executes the foregoing procedure of invoking the binary configuration file by using the driver implementation code through the configuration parser 101, or implements a procedure of directly invoking the C language configuration file by using the driver implementation code. The internal memory 121 may include a program storage area and a data storage area. The program storage area may store an operating system, an application required by at least one function (for example, a voice playing function or an image playing function), and the like.

In addition, a hardware architecture of a management device (for example, the management device 200) provided in embodiments of this application may also be implemented by using the hardware structure of the electronic device 100 shown in FIG. 15. Details are not described again in this embodiment of this application.

Further, when the management device 200 is implemented based on the hardware structure shown in FIG. 15, the processor 110 may support the management device 200 in generating a text configuration file such as a C language configuration file for a lightweight device (for example, the electronic device 100*b*), and generating a binary configuration file for a fullweight device (for example, the electronic device 100*a*). The wireless communication function provided by modules such as the mobile communication module 150 and the wireless communication module 160 may support the management device 200 in sending the generated configuration file to the electronic device. Modules such as the GPU, the display 194, and the application processor are configured to support the management device 200 in displaying a driver configuration management interface to interact with a user.

A software system of the electronic device 100 may use a layered architecture, an event-driven architecture, a micro-kernel architecture, a micro service architecture, or a cloud architecture. In an embodiment of this application, an Android system with a layered architecture is used as an example to describe a software structure of the electronic device 100.

Figure 16:
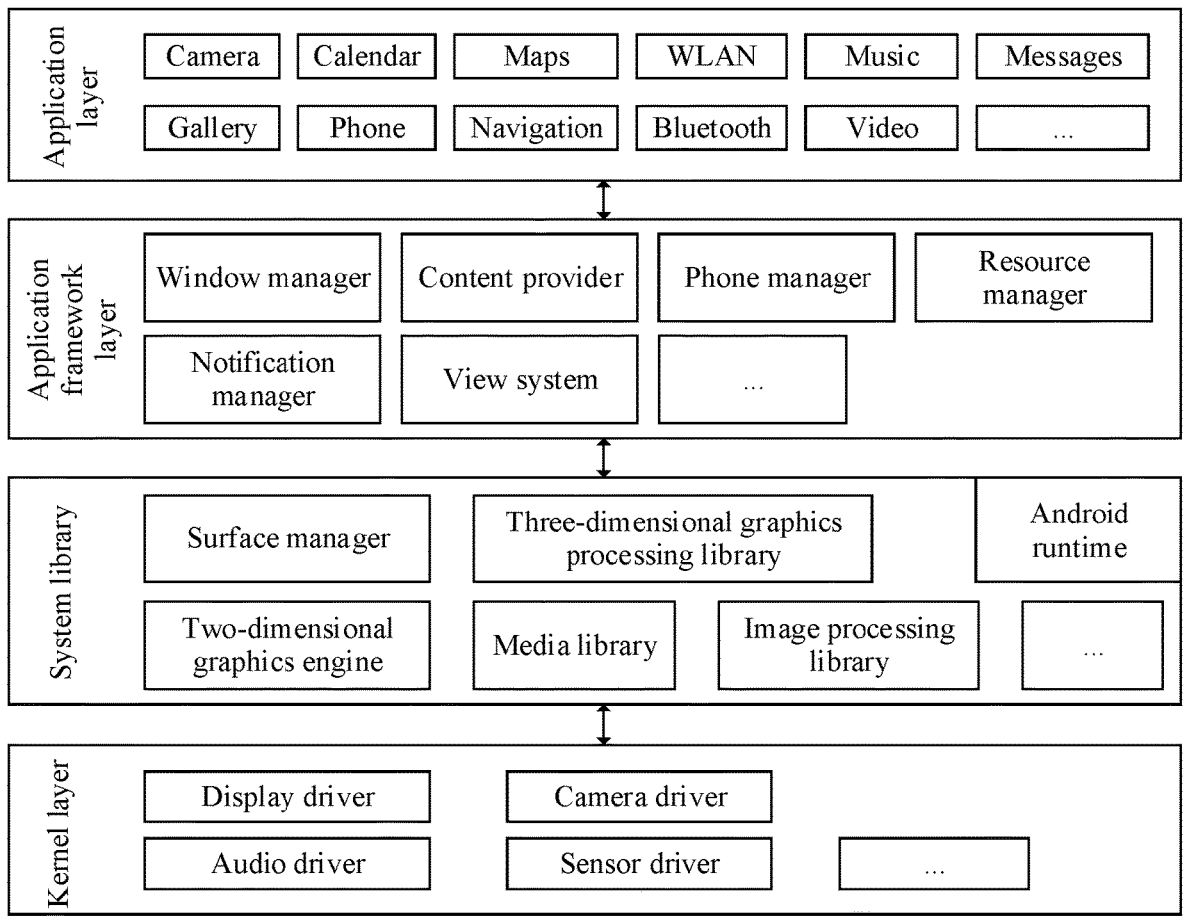
FIG. 16 is a block diagram of a software structure of an electronic device according to some embodiments of this application.

FIG. 16 is a block diagram of the software structure of the electronic device (for example, the electronic device 100*a* or the electronic device 100*b*) according to this embodiment of this application. Software is divided into several layers by using the layered architecture, and each layer has a clear role and task. The layers communicate with each other through a software interface. In some embodiments, the Android system is divided into four layers: an application layer, an application framework layer, an Android runtime and system library, and a kernel layer from top to bottom. The application layer may include a series of application packages.

As shown in FIG. 16, the application packages may include applications such as Camera, Gallery, Calendar, Phone, Map, Navigation, WLAN, Bluetooth, Music, Videos, and Messages.

The application framework layer provides an application programming interface (API) and a programming framework for an application at the application layer. The application framework layer includes some predefined functions.

As shown in FIG. 16, the application program framework layer may include a window manager, a content provider, a view system, a phone manager, a resource manager, a notification manager, and the like.

The window manager is configured to manage a window program. The window manager may obtain a size of a display, determine whether there is a status bar, lock a screen, take a screenshot, and the like.

The content provider is configured to: store and obtain data, and enable the data to be accessed by an application. The data may include a video, an image, audio, calls that are made and received, a browsing history and a bookmark, an address book, and the like.

The view system includes visual controls such as a control for displaying a text and a control for displaying an image. The view system may be configured to construct an application. A display interface may include one or more views. For example, a display interface including a notification icon of Messages may include a text display view and a picture display view.

The phone manager is used to provide a communication function of the electronic device 100, for example, management of a call status (including answering, declining, or the like).

The resource manager provides various resources such as a localized string, an icon, an image, a layout file, and a video file for an application.

The notification manager enables an application to display notification information in a status bar, and may be configured to convey a notification message. The notification manager may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application running on a background or a notification that appears on the interface in a form of a dialog window. For example, text information is displayed in the status bar, an announcement is given, the electronic device vibrates, or the indicator light blinks.

The Android runtime includes a kernel library and a virtual machine. The Android runtime is responsible for scheduling and management of the Android system.

The kernel library includes two parts: a function that needs to be invoked by a Java language and a kernel library of Android.

The application layer and the application framework layer run on the virtual machine. The virtual machine executes Java files of the application layer and the application framework layer as binary files. The virtual machine is configured to implement functions such as object lifecycle management, stack management, thread management, security and exception management, and garbage collection.

The system library may include a plurality of function modules, for example, a surface manager, a media library, a three-dimensional graphics processing library (for example, OpenGL ES), and a two-dimensional (2D) graphics engine (for example, SGL).

The surface manager is configured to manage a display subsystem and provide fusion of 2D and three-dimensional (3D) layers for a plurality of applications.

The media library supports playback and recording in a plurality of commonly used audio and video formats, and static image files. The media library may support a plurality of audio and video coding formats such as Moving Pictures Expert Group 4 (MPEG4), H.264, MPEG Audio Layer 3 (MP3), Advanced Audio Coding (AAC), Adaptive Multi-Rate (AMR), Joint Photographic Experts Group (JPG), and Portable Network Graphic (PNG).

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver, for example, the foregoing driver that interacts with the binary configuration file or the C language configuration file (for example, the foregoing interface function, namely, "HdfUetSampleModuleConfigRoot" in the example, is used to obtain a configuration).

Embodiments of mechanisms disclosed in this application may be implemented in hardware, software, firmware, or a combination of these implementation methods. Embodiments of this application may be implemented as a computer program or program code that is executed on a programmable system, and the programmable system includes at least one processor, a storage system (including volatile and nonvolatile memories and/or a storage element), at least one input device, and at least one output device.

The program code may be applied to input instructions, to perform functions described in this application and generate output information. The output information may be applied to one or more output devices in a known manner. For a purpose of this application, a processing system includes any system with a processor such as a digital signal processor (DSP), a microcontroller, an application-specific integrated circuit (ASIC), or a microprocessor.

The program code may be implemented in a high-level procedural language or an object-oriented programming language, to communicate with the processing system. The program code may alternatively be implemented by using an assembly language or a machine language when required. Actually, the mechanism described in this application is not limited to a scope of any particular programming language. In any case, the language may be a compiled language or an interpretive language.

In some cases, the disclosed embodiments may be implemented by hardware, firmware, software, or any combination thereof. The disclosed embodiments may be alternatively implemented as instructions carried by or stored on one or more temporary or non-temporary machine-readable (for example, computer-readable) storage media, and the instructions may be read and executed by one or more processors. For example, the instructions may be distributed through a network or another computer-readable medium. Therefore, a machine-readable medium may include any mechanism for storing or transmitting information in a machine (for example, a computer)-readable form, including but not limited to a floppy disk, a compact disc, an optical disc, a compact disc read-only memory (CD-ROM), a magnetic optical disk, a ROM, a RAM, an erasable programmable read-only memory (EPROM), an electrically erasable programmable read-only memory (EEPROM), a magnetic card, an optical card, a flash memory, or a tangible machine-readable memory for transmitting information (for example, a carrier, an infrared signal, or a digital signal) by using a propagating signal in an electrical, optical, acoustic, or another form over the Internet. Therefore, the machine-readable medium includes any type of machine-readable medium that is suitable for storing or transmitting electronic instructions or information in a machine (for example, a computer)-readable form.

In the accompanying drawings, some structural or method features may be shown in a particular arrangement and/or order. However, it should be understood that such a particular arrangement and/or order may not be required. In some embodiments, these features may be arranged in a manner and/or order different from that shown in the descriptive accompanying drawings. In addition, inclusion of the structural or method features in a particular figure does not imply that such features are required in all embodiments, and in some embodiments, these features may not be included or may be combined with other features.

It should be noted that all units/modules mentioned in the device embodiments of this application are logical units/modules. Physically, one logical unit/module may be one physical unit/module, or may be a part of one physical unit/module, or may be implemented by a combination of a plurality of physical units/modules. Physical implementations of these logical units/modules are not the most important, and a combination of functions implemented by these logical units/modules is a key to resolving technical problems proposed in this application. In addition, to highlight an innovative part of this application, a unit/module that is not closely related to resolving the technical problems proposed in this application is not introduced in the foregoing device embodiments of this application. This does not indicate that there is not another unit/module in the foregoing device embodiments.

It should be noted that, in examples and the specification of this patent, relational terms such as first and second are only used to distinguish one entity or operation from another entity or operation, and do not necessarily require or imply that any actual relationship or sequence exists between these entities or operations. Moreover, the terms "include", "contain", or any other variant thereof is intended to cover a non-exclusive inclusion, so that a process, a method, an article, or a device that includes a list of elements not only includes those elements but also includes other elements that are not expressly listed, or further includes elements inherent to such a process, method, article, or device. An element preceded by "includes a" does not, without more constraints, preclude the presence of additional identical elements in the process, method, article, or device that includes the element.

Although this application has been illustrated and described with reference to some preferred embodiments of this application, a person of ordinary skill in the art should understand that various changes may be made to this application in form and detail without departing from the spirit and scope of this application.

The invention claimed is:

1. A driver configuration management method, applied to a management device and comprising:
   determining target information representing a computing capability of an electronic device;
   converting, based on the target information, a configuration source file into a target configuration file that uses a target file format;
   compiling a driver implementation code of the electronic device based on the target configuration file to obtain a file of the driver implementation code; and
   sending the target configuration file to the electronic device,
   wherein when the computing capability is a second-type computing capability, the target file format is a binary format and the configuration source file is converted into the target configuration file through compilation based on a predefined bytecode rule, and wherein the target configuration file supports invoking, by the electronic device, the driver implementation code after the electronic device performs parsing based on the predefined bytecode rule.

2. The driver configuration management method of claim 1, wherein when the computing capability is a first-type computing capability, the target configuration file supports direct invoking of the driver implementation code of the electronic device.

3. The driver configuration management method of claim 2, wherein the target file format is based on at least one of: a C language, a C++ language, or a Java language.

4. The driver configuration management method of claim 2, wherein after converting, based on the target information, the configuration source file into the target configuration file that uses the target file format, the driver configuration management method further comprises:
   outputting the file of the driver implementation code to a readable and writable storage area in the electronic device.

5. The driver configuration management method of claim 1, wherein sending the target configuration file to the electronic device comprises outputting the target configuration file to a read-only storage area in the electronic device.

6. The driver configuration management method of claim 1, wherein the computing capability of the electronic device comprises at least one of: a clock frequency of a processor in the electronic device, a first capacity of a random-access memory (RAM) of the electronic device, or a second capacity of a read-only memory (ROM) of the electronic device.

7. The driver configuration management method of claim 1, wherein determining the target information comprises:
   receiving a target operation performed by a user on a target control, wherein the target control triggers selection of one piece of information from at least two pieces of information, and wherein the at least two pieces of information are in a one-to-one correspondence with at least two file formats; and
   selecting, in response to the target operation, the one piece of information as the target information.

8. The driver configuration management method of claim 1, wherein converting the configuration source file into the target configuration file that uses the target file format comprises:
   converting the configuration source file into a plurality of syntax unit sequences;
   verifying whether the plurality of syntax unit sequences meets a predefined syntax rule;
   converting, when the plurality of syntax unit sequences meets the predefined syntax rule, the plurality of syntax unit sequences into an abstract syntax tree;
   updating the abstract syntax tree based on a first syntax rule, wherein the first syntax rule comprises at least a redefinition check and reference expansion processing; and
   converting, based on the target information, the abstract syntax tree into the target configuration file that uses the target file format.

9. A driver configuration management method applied to an electronic device, wherein the driver configuration management method comprises:
   obtaining a target configuration file that uses a target file format, wherein the target file format corresponds to a computing capability of the electronic device, and wherein when the computing capability is a second-type computing capability, the target file format is a binary format and the target configuration file is based on a predefined bytecode rule;
   obtaining a driver implementation code of the electronic device, wherein the driver implementation code is based on compilation, and wherein the compilation is based on the target configuration file; and
   configuring and driving hardware in the electronic device based on the target configuration file, wherein when the computing capability is the second-type computing capability, configuring and driving the hardware in the electronic device based on the target configuration file comprises invoking the driver implementation code.

10. The driver configuration management method of claim 9, wherein configuring and driving the hardware in the electronic device based on the target configuration file comprises invoking, when the computing capability is a first-type computing capability, the target configuration file using the driver implementation code to configure and drive the hardware in the electronic device.

11. The driver configuration management method of claim 10, wherein the target file format is based on at least one of: a C language, a C++ language, or a Java language.

12. The driver configuration management method of claim 10, further comprising
   storing the driver implementation code in a readable and writable storage area in the electronic device.

13. The driver configuration management method of claim 10, wherein configuring and driving the hardware in the electronic device based on the target configuration file comprises:
   parsing, when the target file format is the binary format, the target configuration file into a configuration tree based on the predefined bytecode rule; and invoking the configuration tree using the driver implementation code of the electronic device to configure and drive the hardware in the electronic device.

14. The driver configuration management method of claim 9, further comprising storing the target configuration file in a read-only storage area in the electronic device.

15. The driver configuration management method of claim 9, wherein the computing capability of the electronic device comprises at least one of: a clock frequency of a processor in the electronic device, a capacity of a random-access memory (RAM) of the electronic device, or a capacity of a read-only memory (ROM) of the electronic device.

16. A management device, comprising:
a memory configured to store program instructions; and
a processor coupled to the memory and configured to execute the program instructions to cause the management device to:
determine target information representing a computing capability of an electronic device;
convert, based on the target information, a configuration source file into a target configuration file that uses a target file format;
compile a driver implementation code of the electronic device based on the target configuration file to obtain a file of the driver implementation code; and
send the target configuration file to the electronic device,
wherein when the computing capability is a second-type computing capability, the target file format is a binary format and the processor is further configured to execute the program instructions to cause the management device to obtain the target configuration file through compilation based on a predefined bytecode rule, and wherein the target configuration file supports the electronic device invoking the driver implementation code after parsing based on the predefined bytecode rule.

17. The management device of claim 16, wherein the processor is further configured to execute the program instructions to cause the management device to output the file of the driver implementation code to a readable and writable storage area in the electronic device.

18. The management device of claim 16, wherein the computing capability of the electronic device comprises at least one of: a clock frequency of a second processor in the electronic device, a first capacity of a random-access memory (RAM) of the electronic device, or a second capacity of a read-only memory (ROM) of the electronic device.

19. The management device of claim 16, wherein the processor is further configured to execute the program instructions to cause the management device to determine the target information by:
receiving a target operation performed by a user on a target control, wherein the target control triggers selection of one piece of information from at least two pieces of information, and wherein the at least two pieces of information are in a one-to-one correspondence with at least two file formats; and
selecting, in response to the target operation, the one piece of information as the target information.

20. The management device of claim 16, wherein the processor is further configured to execute the program instructions to cause the management device to convert the configuration source file into the target configuration file that uses the target file format by:
converting the configuration source file into a plurality of syntax unit sequences;
verifying whether the plurality of syntax unit sequences meets a predefined syntax rule;
converting, when the plurality of syntax unit sequences meets the predefined syntax rule, the plurality of syntax unit sequences into an abstract syntax tree;
updating the abstract syntax tree based on a first syntax rule, wherein the first syntax rule comprises at least a redefinition check and reference expansion processing; and
converting, based on the target information, the abstract syntax tree into the target configuration file that uses the target file format.

* * * * *